United States Patent
Johnson

(10) Patent No.: US 8,693,466 B2
(45) Date of Patent: Apr. 8, 2014

(54) APPARATUS AND METHODS FOR BRIDGING CALLS OR DATA BETWEEN HETEROGENEOUS NETWORK DOMAINS

(75) Inventor: Timothy Johnson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1210 days.

(21) Appl. No.: 12/420,715

(22) Filed: Apr. 8, 2009

(65) Prior Publication Data

US 2010/0260173 A1 Oct. 14, 2010

(51) Int. Cl.
 *H04L 12/66* (2006.01)
 *H04W 40/00* (2009.01)

(52) U.S. Cl.
 USPC ............................ 370/356; 370/352; 455/448

(58) Field of Classification Search
 USPC .................. 370/310–338, 352–356, 386–390, 370/401–465; 709/224–229, 230–249; 455/426–448; 379/88–93, 201–221
 See application file for complete search history.

(56) References Cited

U.S. PATENT DOCUMENTS

| | | | |
|---|---|---|---|
| 6,161,007 A | 12/2000 | McCutcheon et al. | |
| 6,185,291 B1 | 2/2001 | Miloslavsky | |
| 6,760,324 B1 * | 7/2004 | Scott et al. | 370/352 |
| 7,006,625 B2 | 2/2006 | Rodriguez et al. | |
| 7,016,338 B2 * | 3/2006 | Gunn et al. | 370/352 |
| 7,107,605 B2 | 9/2006 | Janik | |
| 7,120,241 B1 | 10/2006 | Fuoss et al. | |
| 7,123,608 B1 * | 10/2006 | Scott et al. | 370/353 |
| 7,130,616 B2 | 10/2006 | Janik | |
| 7,142,934 B2 | 11/2006 | Janik | |
| 7,142,935 B2 | 11/2006 | Janik | |
| 7,167,765 B2 | 1/2007 | Janik | |
| 7,184,786 B2 | 2/2007 | Mumick et al. | |
| 7,251,484 B2 | 7/2007 | Aslanian | |
| 7,274,684 B2 * | 9/2007 | Young et al. | 370/352 |
| 7,283,808 B2 | 10/2007 | Castell et al. | |
| 7,330,465 B2 * | 2/2008 | Patfield et al. | 370/352 |
| 7,373,141 B2 | 5/2008 | Kwon | |
| 7,376,221 B1 | 5/2008 | Remy et al. | |
| 7,380,022 B2 * | 5/2008 | Tell et al. | 709/249 |
| 7,400,881 B2 * | 7/2008 | Kallio | 455/412.2 |
| 7,412,257 B2 | 8/2008 | Loveland | |
| 7,433,464 B2 | 10/2008 | Grant et al. | |
| 7,668,515 B2 * | 2/2010 | Mayblum et al. | 455/90.2 |
| 7,761,579 B2 * | 7/2010 | Khasnabish | 709/227 |
| 7,782,876 B2 * | 8/2010 | Rogalski et al. | 370/401 |
| 7,835,751 B2 * | 11/2010 | Ibe et al. | 455/448 |
| 2001/0012357 A1 * | 8/2001 | Mirashrafi et al. | 379/387.01 |
| 2002/0009071 A1 * | 1/2002 | Yaary et al. | 370/352 |
| 2002/0136226 A1 * | 9/2002 | Christoffel et al. | 370/401 |
| 2004/0052339 A1 * | 3/2004 | Mirashrafi et al. | 379/88.17 |

(Continued)

*Primary Examiner* — Man Phan
(74) *Attorney, Agent, or Firm* — Womble Carlyle Sandridge & Rice LLP

(57) ABSTRACT

Methods and apparatus for unified communication across circuit-switched and packet-switched network domains. In one embodiment, voice or data available in one domain (e.g., circuit-switched such as a PSTN) can be seamlessly forwarded onto another domain (e.g. packet-switched such as a WLAN). A bridge or intermediary device is used that is coupled to both the circuit-switched network and packet-switched network. This bridge device allows bidirectional operation and permits, for example, a user to receive a telephone call at a user's home network via a PSTN, and forward that telephone call or information related to that call over another network such as a local IP network (e.g. a WLAN) to the user, where the user can answer that call or otherwise receive information associated with the call on their primary user device (e.g., cellular phone).

26 Claims, 14 Drawing Sheets

(56) References Cited

U.S. PATENT DOCUMENTS

| | | | |
|---|---|---|---|
| 2006/0002355 A1* | 1/2006 | Baek et al. | 370/338 |
| 2006/0178138 A1* | 8/2006 | Ostroff et al. | 455/426.1 |
| 2007/0112964 A1* | 5/2007 | Guedalia et al. | 709/227 |
| 2007/0153768 A1* | 7/2007 | Jagadesan et al. | 370/352 |
| 2007/0160034 A1* | 7/2007 | Koretsky | 370/352 |
| 2007/0171898 A1* | 7/2007 | Salva | 370/356 |
| 2007/0183396 A1* | 8/2007 | Bennett et al. | 370/352 |
| 2007/0183397 A1* | 8/2007 | Bennett | 370/352 |
| 2007/0183398 A1* | 8/2007 | Bennett et al. | 370/352 |
| 2007/0183399 A1* | 8/2007 | Bennett | 370/352 |
| 2007/0183400 A1* | 8/2007 | Bennett et al. | 370/352 |
| 2007/0183401 A1* | 8/2007 | Bennett | 370/352 |
| 2007/0183405 A1* | 8/2007 | Bennett | 370/352 |
| 2007/0183407 A1* | 8/2007 | Bennett et al. | 370/352 |
| 2007/0189280 A1* | 8/2007 | Hancock | 370/356 |
| 2007/0201451 A1* | 8/2007 | Bennett | 370/356 |
| 2009/0059896 A1* | 3/2009 | Stober et al. | 370/352 |
| 2009/0245236 A1* | 10/2009 | Scott et al. | 370/352 |

* cited by examiner

APPARATUS AND METHODS FOR BRIDGING CALLS OR DATA BETWEEN HETEROGENEOUS NETWORK DOMAINS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of communication and data networks. More particularly, in one exemplary aspect, the present invention is directed to methods and apparatus for bridging between circuit-switched (e.g., PSTN or POTS) and packet-switched (e.g., VoIP or digital wireless) communications environments.

2. Description of Related Technology

Voice over Internet Protocol (VoIP) is a general term for a family of transmission technologies adapted for delivery of voice communications over the Internet or other packet-switched networks. VoIP systems typically interface with a traditional public switched telephone network (PSTN) or plain-old telephone system (POTS) to allow for effectively transparent phone communications with existing non-packet switched infrastructure. VoIP can be beneficial for, inter alia, reducing communication and infrastructure costs by routing phone calls over existing data networks, and avoiding duplicate network systems.

Wireless technology enables a plurality of user devices (e.g., mobile telephones, hand-held devices such as PDAs, or laptop computers) to communicate without wires, thereby enabling a wide variety of desirable applications leveraging improved mobility and convenience for the user. One such wireless technology is known as wireless Local Area Networking (LAN) or WLAN, such as for example one compliant with IEEE Std. 802.11 ("Wi-Fi™"). Wi-Fi is one exemplary wireless technology providing network access via spread-spectrum or Orthogonal Frequency Division Multiplexing (OFDM) modulation techniques. WLAN installations and "hot spots" are highly popular for a wide-ranging audience including everyone from home users and small businesses operators to large corporations and even city-wide publicly offered access. The ease of WLAN installation/operation, along with a large amount of market penetration and a plethora of WLAN capable devices (e.g. laptops, smartphones, etc.) help ensure WLAN's future growth and continued popularity.

Wireless phones that make use of both VoIP and WLAN protocols are now prevalent in the marketplace. For example, Netgear™ manufactures a Wi-Fi phone for use with the Skype™ VoIP service, while UTStarcom™ manufactures a Wi-Fi phone for use with the Vonage™ service. In order to use either of these phones, one must have an account with that provider, generally analogous to a service plan from a cell phone service provider for use a particular cellular phone. The phone is then configured the phone to work within the network.

Cellular telephone technology, such as the Universal Mobile Telecommunications System (UMTS) is an exemplary implementation of a cellular telephone technology. The UMTS standard is specified by a collaborative body referred to as the $3^{rd}$ Generation Partnership Project (3GPP). Other types of cellular technology include without limitation analog cellular (e.g., AMPS), so-called "2G" systems (e.g., GSM and IS-95A CDMA), "2.5G" systems (such as EDGE), and LTE (long term evolution) systems.

VoIP, PSTN/POTS, and cellular telephone networks are currently capable of some degree of interoperation (i.e., a VoIP user could make and receive phone calls with other users of a PSTN or a cellular telephone network via, e.g., a gateway or other bridging device). However, despite this interoperability, such traditional solutions fail to provide adequate support for integrating these various services (i.e., VoIP, PSTN/POTS, cellular, etc.) for a single user. For example, a given user may have a "landline" or PSTN/POTS telephone service at their residence, and may also have a cellular telephone subscription (e.g., 3G UMTS), but there is effectively no cooperation or crossover between the two networks. One can call their cellular phone from their PSTN/POTS line and vice versa (interoperability), but a call received on the PSTN/POTS line is not forwarded or connected to the cellular phone (except via "call forwarding" functionality if present, which adds cost along with any charges incurred through use of the cellular network).

Moreover, traditional call forwarding technologies require changes to their configuration as the user's situation changes; for example, a user wanting a PSTN/POTS call forwarded to their cellular phone under a first circumstance (e.g., they are at the pool of their apartment building) then must "unforward" the call when they return to their apartment in order to utilize the PSTN/POTS infrastructure (e.g., their cordless 900 MHz or 5.8 GHz phone), or their PC-based phone.

Hence, what is needed are improved apparatus and methods that allow for interoperability as well as unification or crossover between different call environments and network topologies. Such an improved solution should operate seamlessly and without adversely impacting user experience, so that voice or data available in one domain (e.g. analog PSTN/POTS) can be seamlessly forwarded onto another domain (e.g., digital WLAN or PAN). For example, a user could receive a telephone call via a PSTN/POTS line and forward that telephone call (or information related to that call, such as a caller's message) over another network such as a "local" wireless network (e.g., a WLAN) to the user, where the user can answer the call (or access the forwarded information).

Ideally, such improved apparatus and methods would also be bidirectional in operation so that a user could access the bridge device via the local network, and forward on voice and/or data via the bridge device to a PSTN/POTS or other call environment. Significant flexibility would also be offered to the user in terms of location, and power consumption aspects of the mobile device (e.g., cellular phone or smartphone) acting as a cordless "proxy".

SUMMARY OF THE INVENTION

The present invention satisfies the aforementioned needs by providing improved apparatus and methods for bridging calls or data between heterogeneous network domains.

In a first aspect of the invention, a method of forwarding circuit-switched information to a mobile device is disclosed. In one embodiment, the mobile device is configured for packetized local area operation, and the method includes: receiving a call via a circuit switched network, the call comprising at least one of voice or data; converting the at least one of voice or data into a format suitable for transmission onto a wireless local area packetized network; and transmitting the converted at least one of voice or data wirelessly to the mobile device via the local area packetized network.

In one variant, the method further includes: receiving at least one of voice or data from the mobile device; converting the received at least one of voice or data from the mobile to a format suitable for transmission over a circuit switched network; and transmitting the converted at least one voice or data over the circuit switched network to a recipient.

In another variant, receiving a call includes receiving the at least one of voice call rendered in an analog form, and the conversion includes encoding the analog form to a digital form using a coder/decoder (codec). The codec may comprise for example a CELP-based codec.

In still another variant, the local area packetized network includes a WLAN network compliant with IEEE Std. 802.11, and transmitting the converted at least one of voice or data wirelessly to the mobile device via the local area packetized network includes transmitting from an IEEE Std. 802.11 access point (AP) to the mobile device.

In a further variant, the at least one of voice or data includes voice, and the method further includes: receiving the transmitted converted voice at the mobile device; converting the received converted voice to an analog form; and playing the analog form of the voice over a speaker of the mobile device.

In yet another variant, the mobile device includes a substantially mobile communication address, and the received call is intended for a circuit switched telephone number. The converted voice or data is transmitted to the substantially mobile communication address, which may comprise for example an Internet protocol (IP) or other network address.

In still another variant, the converted at least one voice or data includes a digitally rendered voicemail message.

In another variant, the method further includes: operating the mobile device in a substantially dormant mode; and waking at least a portion of the mobile device from the dormant mode when a wireless transceiver of the mobile device detects the transmission of the converted at least one voice or data call.

In a further variant, the method includes causing a cellular interface of the mobile device to indicate a busy or call waiting state while receiving the transmission of the converted at least one of voice or data.

In a second aspect of the invention, a method of forwarding circuit switched voice signals to a mobile cellular-capable communications device is disclosed. In one embodiment, the forwarding is performed without use of a cellular interface, and the method includes: receiving a call from a circuit switched network; storing at least a portion of voice signals associated with the call for at least a period of time; converting the voice signals into a text format suitable for transmission onto a packet protocol network; and transmitting the text readable format voice signals onto the packet protocol network to the mobile device. The transmitting is performed without use of a cellular interface of the mobile device.

In one variant, the mobile device is a 3G-enabled cellular smartphone, and the transmitting is performed using a WLAN transceiver.

In another variant, the acts of receiving, storing, converting and transmitting are performed substantially within apparatus disposed at a premises of a user associated with the mobile device.

In still another variant, the converting includes utilizing a speech recognition algorithm to recognize the voice signals and convert them to the text.

In a third aspect of the invention, a method for processing a Voice over Internet Protocol (VoIP) based call is disclosed. In one embodiment, the method includes: receiving the call from a remote user device over an Internet Protocol (IP) network; and establishing communications with an intended recipient of the call via a local wireless network and a mobile communications device having cellular capability.

In one variant, the local wireless network is a packet protocol network compliant with IEEE Std. 802.11, and the mobile communications device includes a cellular telephone having an IEEE Std. 802.11 wireless interface.

In another variant, the act of receiving a call from a remote user over an IP network includes receiving the call over a circuit-switched POTS or PSTN line in operative communication with the IP network. The call received over the POTS or PSTN line may comprise for example an analog voice call, the analog voice call being derived from the VoIP based call or a packet-protocol call received using a modem selected from the group consisting of: (i) V.90 modems, and (ii) DSL modems.

In still another variant, the act of receiving a call from a remote user over an IP network includes receiving the call over DOCSIS cable modem.

In yet another variant, the act of receiving a call from a remote user over an IP network includes receiving the call over a modem coupled to a wireless satellite network.

In a fourth aspect of the invention, apparatus adapted for enabling communication between two or more networks is disclosed. In one embodiment, the two or more networks have different topologies, and the apparatus includes: a first network interface in operative communication with a first network having a first topology; a second network interface in operative communication with a second network having a second topology, the second topology being different than the first topology; a processor in communication with the first and second network interfaces; and a storage device in data communication with the processor, the storage device comprising a computer program having a plurality of executable instructions. When executed by the processor, these instructions enable at least one of voice or data received via the first network interface to be transmitted from the second network interface.

In one variant, the first network is a POTS or PSTN network having a circuit-switched topology, and the second network includes a wireless LAN network having a packet-switched topology, and the computer program includes an encoding algorithm adapted to convert analog signals associated with the at least one of voice or data received via the first interface to a digital format, the digital format suitable for packetization and delivery over the wireless LAN to a wireless mobile device.

In further variants, the apparatus is a personal computer (PC) or a stand-alone box or a wireless dongle adapted to mechanically and electrically interface with another device.

In another variant, the mechanical and electrical interface is a high speed serialized bus protocol interface (e.g., IEEE Std. 1394 or a USB interface).

In still a further variant, the wireless dongle is a wireless interface with IEEE Std. 802.11, and the other device includes a personal computer (PC).

In another variant, the apparatus is a POTS- or PSTN-capable telephony device.

In a fifth aspect of the invention, a method of multi-network agile communication is disclosed. In one embodiment, the method s; receiving a call via a first network; processing the call for use on a second network; and delivering the call over the second network to a device also capable of receiving the call over a third network.

In one variant, the first network is a PSTN or POTS network, the second network includes a wireless local area network (LAN), and the third network is a wireless cellular network. The device includes a mobile device having both wireless LAN and cellular air interfaces.

In a further variant, the processing and delivering are performed without utilizing a call forwarding process, or are performed substantially within the same user premises.

In another variant, the third network is a cellular network, and the processing and delivering are performed without utilizing the third network.

In still another variant, the first network is a PSTN or POTS network, the second network includes a wireless WiMAX network, and the third network is a wireless cellular network. The device includes a mobile device having both wireless WiMAX and cellular air interfaces. The processing is performed substantially within a first premises of the user, and the delivering includes delivering the call to the device while the device is at a location outside of or remote from the first premises.

In yet another variant, the receiving includes receiving the call over an analog network in an analog form, and the processing includes converting the call from the analog form to a digital form useful within the second network.

In still yet another variant, the receiving includes receiving the call over an analog network in a first digital form, and the processing includes converting the call from the first digital form to a second digital form useful within the second network. The processing may comprise for example transcoding the call from a first codec format to a second codec format.

In a sixth aspect of the invention, a computer readable apparatus is disclosed. In one embodiment, the apparatus includes media comprising a computer program which, when executed, allows for calls and data such as for example analog PSTN/POTS voice calls to be communicated between two or more networks of a user's premises having differing topologies and protocols.

In a seventh aspect of the invention, a unified premises communication system adapted to transfer voice or data calls between heterogeneous premises networks is disclosed. In one embodiment, the system includes a computerized device having first and second network interfaces and a coder/decoder (codec) process running thereon which allows voice data to move bi-directionally and seamlessly between an external telephony (e.g., POTS or PSTN domain) and a packetized wireless (e.g., WLAN or PAN) domain within the premises.

In an eighth aspect of the invention, a message storage and forwarding system is disclosed. In one embodiment, the system includes an apparatus adapted to receive analog POTS/PSTN calls and forward such calls over a packetized protocol wireless network to a user handset, the handset also being capable of cellular telephony and other functions, thereby providing a unified interface for the user to various different data and telephony communication channels. Alternatively, the calls can be: (i) stored at the receiving apparatus and later accessed or "pulled" by the handset, or (ii) "pushed" to the handset and stored thereon.

In a ninth aspect of the invention, methods of doing business based on the foregoing apparatus and methods are disclosed.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
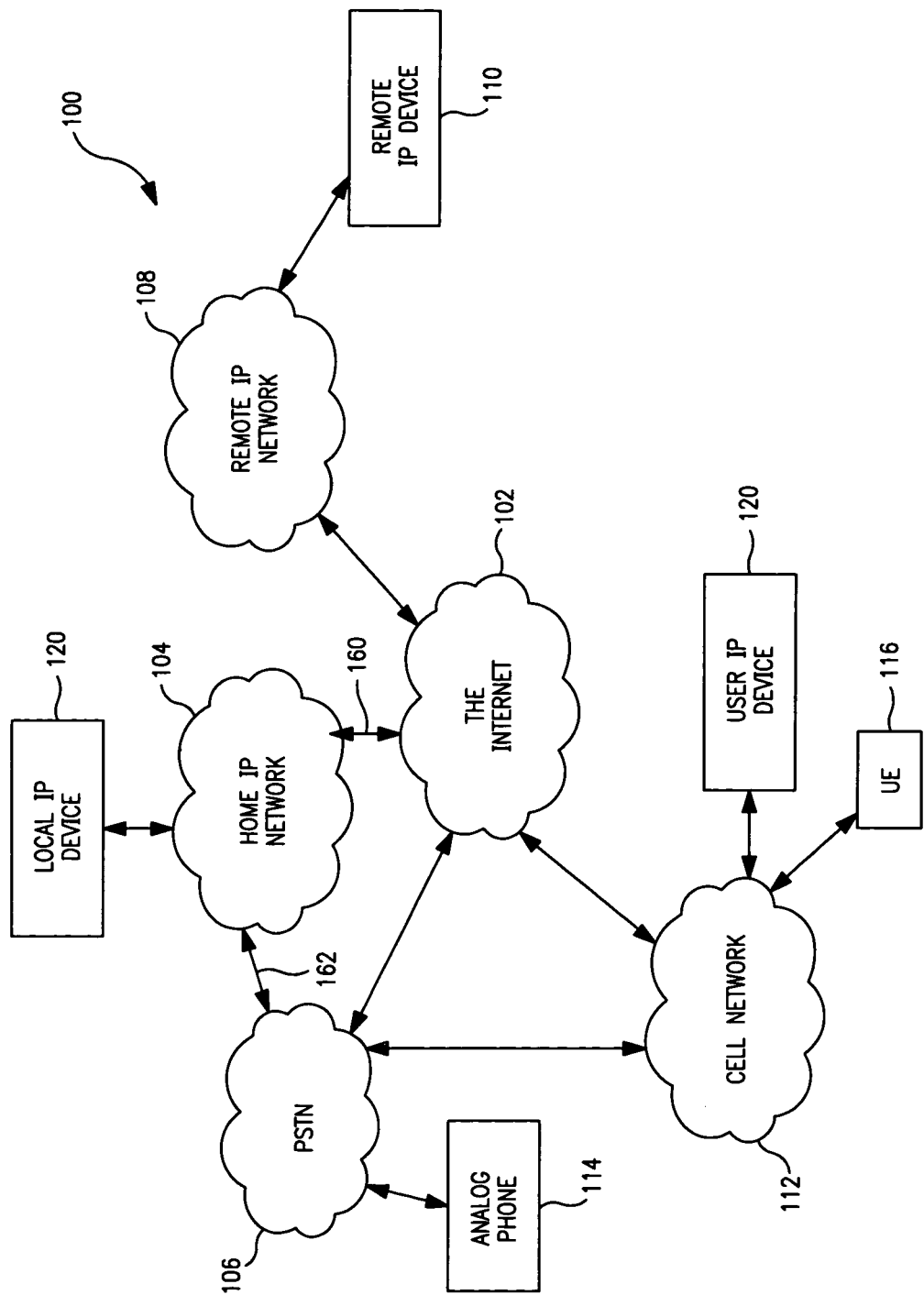
FIG. 1 is a block diagram illustrating one embodiment of a system architecture in accordance with the principles of the present invention.

Reference is now made to the drawings, wherein like numerals refer to like parts throughout.

Overview

In one salient aspect, the present invention provides methods and apparatus for integrating voice and/or data services across a plurality of differing network topologies and environments, such that voice or data available in one domain (e.g., circuit-switched PSTN or POTS) can be seamlessly forwarded to another domain (e.g., packet-switched VoIP via a WLAN or PAN). This capability is useful, inter alia, in applications where a user of a mobile client device (e.g., cellular telephone) would like to receive voice and/or data received on the user's premises (e.g., home or business) PSTN telephone, such as while they are at or proximate to their premises. In effect, the user's cellular telephone or other mobile device acts somewhat like a cordless handset for the PSTN/POTS connection, thereby providing a unified calling environment (i.e., both cellular and POTS/PSTN calling integrated into one platform).

In one embodiment, this functionality is accomplished via the use of a bridge or intermediary device that is in communication with both the PSTN/POTS and the mobile device. This bridge device allows, for example, a user to receive a telephone call at a user's home network via a PSTN, and forward that telephone call (or information related to that call) over another network such as a local wireless network (e.g. IEEE Std. 802.11 WLAN) to the user, where the user can answer that call, or otherwise receive information associated with the call (such as a voicemail message).

In addition, the exemplary bridge device apparatus is bidirectional in operation such that a user can access the bridge device via the local network, and forward voice and/or data via the bridge device to a differing network environment such as a PSTN/POTS, or another packet-switched network.

One important benefit of the exemplary embodiment of the present invention is the ability for the user to maintain most or all of the features of their cellular phone while still receiving both cellular and PSTN-originated calls. For instance, 3G "smartphones" such as the exemplary iPhone device manufactured by the Assignee hereof have a variety of different enhancements and applications which are not present on a simple PSTN phone or answering machine/cordless phone. Features such as enhanced call directory functions, multi-touch display, etc.

Another benefit of the invention is the ability of the user to avoid having to utilize traditional call forwarding techniques (e.g., PSTN call forwarded via a PSTN telecommunications switch to a cellular service provider and ultimately to the user's cellular phone via the cellular network). As previously described, such call forwarding techniques can be ungainly, and require the user to change the configuration when their situation changes.

Yet another benefit of the invention relates to the ability to obviate cellular calls being placed. Such calls can incur additional cost (depending on the user's service plan), and additionally can be spotty in terms of coverage or quality. For instance, a user that has a premises located in a remote region or challenging RF environment (e.g., in the mountains near large granite formations or other natural impediments to RF signal propagation, etc.) may only receive limited or even no cellular service at their premises.

Detailed Description of Exemplary Embodiments

Exemplary embodiments of the present invention are now described in detail. While these embodiments are primarily discussed in the context of a WLAN wireless network (e.g., IEEE Std. 802.11n "Wi-Fi™" implementation), it will be recognized by those of ordinary skill that the present invention is not so limited. In fact, the various aspects of the invention are useful in any communication network that can benefit from the bridging device and methods described herein including without limitation WiMAX and MBWA (IEEE Std. 802.20) networks.

It will further be recognized that while the exemplary embodiments of the invention are described primarily in terms of home (e.g., residential) applications, the various aspects and methods of the invention may be readily applied to other types of environments and uses as well, including for example and without limitation: (i) business or enterprise; (ii) Federal, state or local government; (iii) military; and/or (iv) health care or hospitals.

Moreover, while residential or other premises belonging to or associated with a given user are described, the present invention contemplates applications beyond such boundaries. For instance, the present invention may be used in cases where a user is at a neighbor's residence (e.g., next door, down the street, on another floor in an apartment building, etc.), or at another geographically disparate residence of the same user (e.g., summer home versus winter home), as described in greater detail subsequently herein.

System and Apparatus—

Referring now to FIG. 1, a generalized system architecture 100 useful in implementing the methodologies of the present invention, as discussed subsequently herein, is illustrated and described in detail.

In the illustrated embodiment of FIG. 1, the system architecture 100 generally includes three (3) different types of heterogeneous network topologies (and protocols) that are used in combination with one another. These comprise (i) IP networks such as premises IP network 104 (e.g., an IP network substantially co-located with a user's interface to the Internet 102), a remote IP network 108, and the Internet 102 itself; (ii) cellular network(s) 112, (e.g., GSM, UMTS, 3GPP and/or 3GPP2 cellular networks); and (iii) PSTN(s) 106. Devices useful within these various network topologies include IP devices (whether a local IP device 120 or remote device 110), other user equipment (UE) device(s) 116, analog telephones 114, and the like. As used herein, the terms "user equipment (UE)", "client device", and "user device" may include, but are not limited to cellular telephones, smartphones (such as for example an iPhone™), personal computers (PCs), such as for example an iMaC™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), or any combinations of the foregoing.

As will be appreciated by those of ordinary skill, data (and packetized voice, such as VoIP) communications between the various local and remote IP devices and their associated IP networks can occur using any number of different wired or wireless technologies such as for example IEEE Std. 802.3 (Ethernet), Wi-Fi (IEEE Std. 802.11), WiMAX (IEEE Std. 802.16), PAN, and so forth.

Moreover, while one specific system architecture is shown in FIG. 1, it is appreciated that this architecture is merely illustrative, and any number of other network topologies could be utilized without departing from the principles of the present invention. For instance, different Internet access techniques from the DSL 162 and DOCSIS cable modem 160 interfaces shown in FIG. 1 could be used, such as a T1 line or FTTH. The user IP device 120 shown in FIG. 1 may be integrated with the UE 116, such as in a cellular smartphone, and so forth.

Figure 1A:
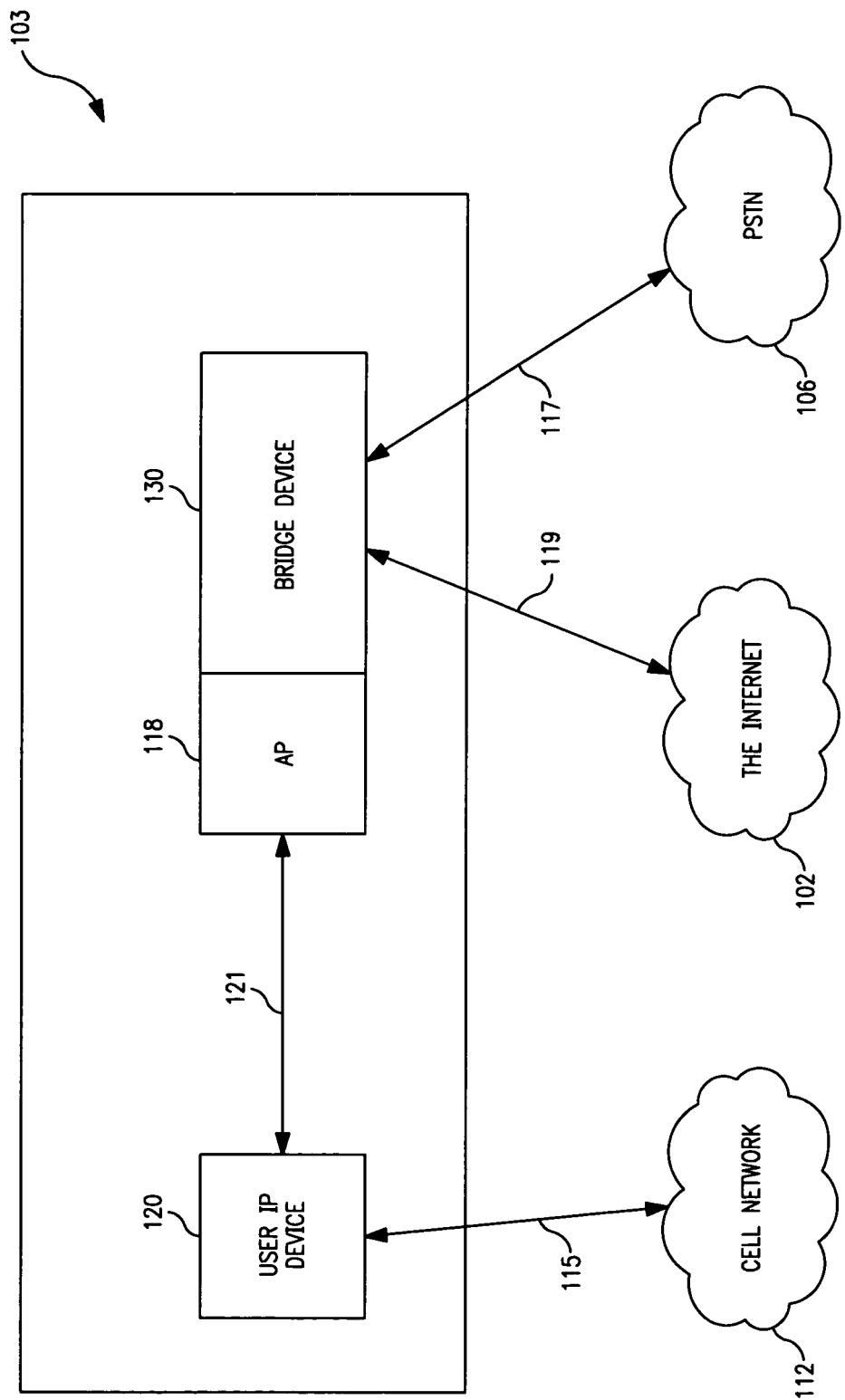
FIG. 1A is a block diagram illustrating one embodiment of a premises IP network in accordance with the principles of the present invention.

Referring now to FIG. 1A, one exemplary embodiment of a premises (e.g., home or residential) communication system 103 according to the present invention is shown and described in detail. The premises system 103 includes in the illustrated embodiment the local network 104 of FIG. 1, and is served by three (3) different network topologies, including (i) the cellular network 112, (ii) the external IP network (such as the Internet) 102, and (iii) a PSTN 106. These interface with the premises system 103 via network interfaces 115, 119 and 117, respectively. Within the home network is a bridge device 130 (see FIG. 1C, discussed subsequently herein) which, in this example, is coupled to both an external IP network 102 such as the Internet, and a PSTN 106. Coupling of the bridge device 130 to the Internet 102 may be accomplished using any number of well known techniques such as via a DOCSIS or other cable modem, T1 line, FTTH optical broadband, ISDN connection, satellite wireless connection, WiMAX connection, or even "piggybacking" off a geographically proximate Wi-Fi AP (not shown), such as that located in a neighbor's apartment or other dwelling.

It will also be recognized that while the Internet connection 119 is shown in FIG. 1A as a separate interface, it may also be integrated with the PSTN interface 117; i.e., the voice band of the PSTN phone line being used for voice calls, and the data band of the PSTN phone line being used for modulated DSL signals (with a splitter or filter employed at the physical connection so as to permit simultaneous operation of both bands), as is well known in the telephony arts. As used herein the term "digital subscriber line" (or "DSL") refers to any form of DSL configuration or service, including without limitation so-called "G.lite" ADSL (e.g., compliant with ITU G.992.2), RADSL: (rate adaptive DSL), VDSL (very high bit rate DSL), SDSL (symmetric DSL), SHDSL or super-high bit-rate DSL, also known as G.shdsl (e.g., compliant with ITU Recommendation G.991.2, approved by the ITU-T February 2001), HDSL: (high data rate DSL), HDSL2: (2nd generation HDSL), and IDSL (integrated services digital network DSL), as well as In-Premises Phoneline Networks (e.g., HPN).

The home network 103 of FIG. 1A also includes a wireless access point 118, such as a Wi-Fi AP with associated WLAN interface 121, which advantageously provides wireless access for wireless-enabled devices to the external IP network 102. As used herein, the term "access point" or "AP" refers generally and without limitation to a network access point (e.g., such as a gateway or router) which allows access for one device to one or more other networks, without limitation to a particular network standard, protocol, or topology.

Hence, in the context of FIG. 1A, the user device 120 might comprise one having both cellular and LAN wireless capabilities (for example a 3G "smartphone" such as the exemplary iPhone product manufactured by the Assignee hereof). The user of this device 120 could then make and receive cellular calls via the cellular interface 115, and also send and receive data (including voice calls, messages, etc. as described subsequently herein in greater detail) via the WLAN interface 121 and AP 118 of the bridge device 130, and either the IP Internet connection 119, or the PSTN interface 117.

Figure 1B:
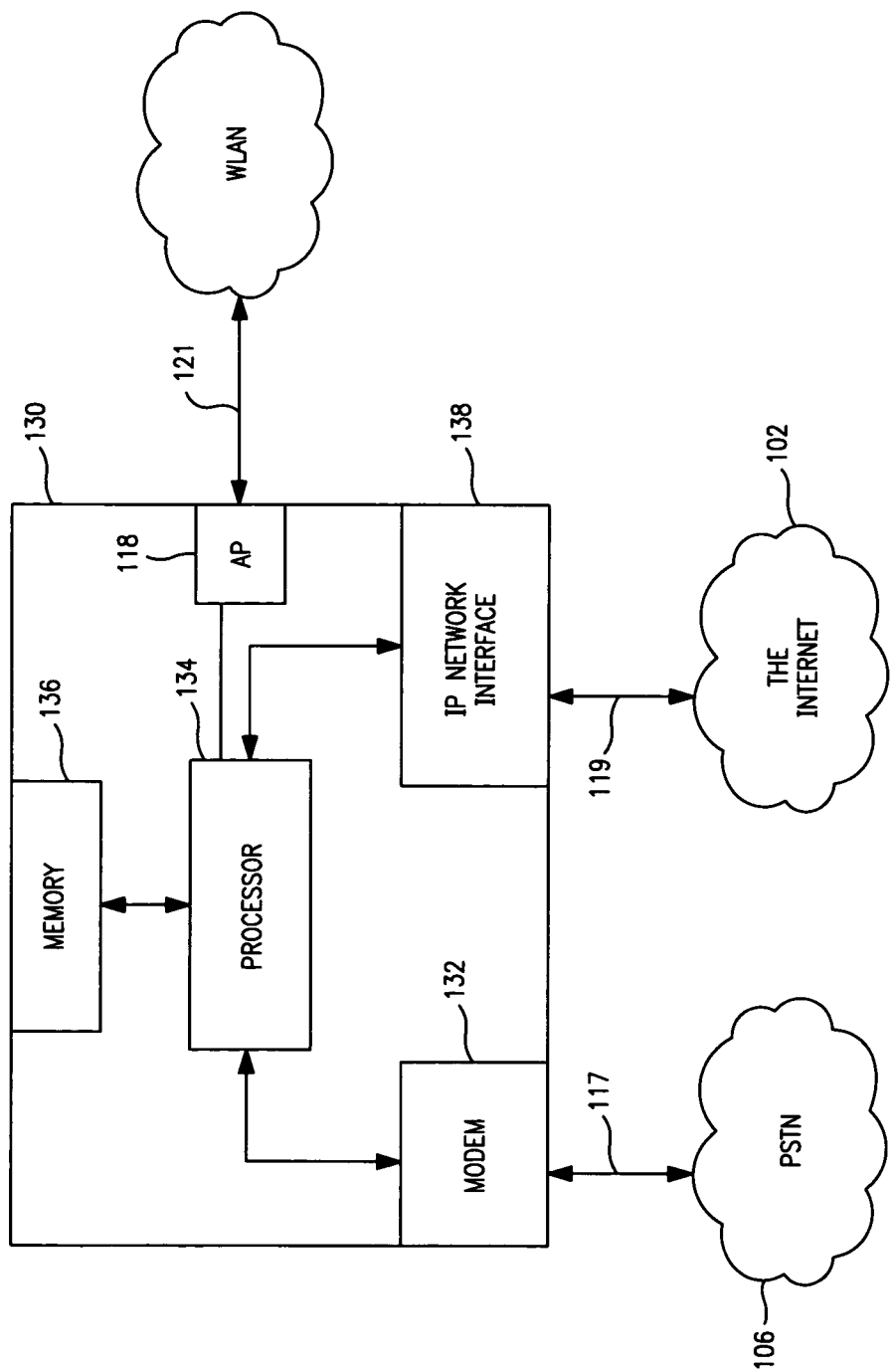
FIG. 1B is a block diagram illustrating one embodiment of a bridge device apparatus configured to implement the methods of the present invention.

Referring now to FIG. 1B, one embodiment of the exemplary bridge device 130 of FIG. 1A is shown and described in greater detail. The bridge device shown in FIG. 1B can be implemented as part of a larger system (e.g., in conjunction with a PC or other premises computing or media delivery device such as an exemplary iMac™ or MacBook™ computer, Apple TV™ multimedia apparatus, digital set-top box DSTB) etc.) for use with cable or satellite networks, etc. integrated with one or more of the forgoing, or alternatively may be constructed as a separate or stand-alone device.

The bridge device in the illustrated embodiment of FIG. 1B includes a plurality of network interfaces. A first network interface includes a modem 132 such as a V.34 or V.90 narrowband or ADSL broadband modem, which allows the bridge device to communicate with a PSTN (e.g., to send and receive calls). Alternatively a "soft" modem of the type well known in the software arts can be used in place of the aforementioned hardware/firmware-based modems. The latter hardware/firmware implementations generally comprise their own discrete resources (e.g., storage, processing, etc.), whereas the typical software (soft) modem utilizes the indigenous resources of the host device (e.g., RAM, CPU, FSB, L1/L2 cache, etc.) to implement the modulation/demodulation functions. Depending on the host (e.g., bridge device 130) capabilities, one or both of the foregoing solutions may be present.

An optional IP network interface 138 of the bridge device 130 permits access to an IP network such as the Internet 102, and may comprise for example a DOCSIS (cable) modem, satellite interface, WiMAX interface, or any number of other broadband or narrowband technologies. A third interface 118 includes the aforementioned AP or access point, in this example a wireless (e.g., Wi-Fi WLAN) interface for communication with devices of a local area wireless network (LAN). The bridge device may also include other types of back-end LAN or communication interfaces, such as an Ethernet NIC/RJ45 connector, FireWire (IEEE Std. 1304) interface, USB (e.g., USB 1.0, USB 2.0, USB 3.0, and/or "Wireless USB") interface, etc. A PAN (e.g., IEEE 802.15) or other short-range personal area network technology may also be utilized for wireless data distribution at the premises.

The various interfaces 132, 118 and 138 may also be in direct data communication with one another (not shown).

The bridge device 130 of the illustrated embodiment further includes a processor 134 (e.g., digital signal processor (DSP), reduced instruction set computer (RISC), general-purpose (CISC) processor, microprocessor, gate array/FPGA, PLDs, reconfigurable compute fabric (RCFs), array processor, secure microprocessor, and application-specific integrated circuit (ASIC)) with access (e.g., DMA) to a storage device or memory 136, and compression or other conversion algorithms (e.g., codecs) running thereon. The processor can in one aspect advantageously receive voice and/or data from the PSTN network interface 132, AP 118, or the IP network interface 138, store or buffer that voice and/or data in memory as required, and process and convert the voice and/or data into a format that is appropriate for the network interface upon which the voice and/or data will be transmitted. For example, the processor can receive an analog voice call via the PSTN network interface, and sample and convert the received phone call into a packetized format suitable for transmission onto an IP network. In one embodiment, a CELP-based codec of the type well known in the signal processing arts (e.g., ACELP, RCELP, QCELP, etc.). The digitized analog voice of the received call is converted using lossy compression to a digital bitstream, which is then packetized and transmitted over the second interface according to networking protocols (e.g., encapsulated into an RTP/RTCP packet stream, with associated QoS). For instance, the receiving device (e.g., user's mobile or cellular smartphone) includes a Wi-Fi interface with which the AP 118 communicates according to the IEEE Std. 802.11 PHY specifications. The receiver in one embodiment further includes a jitter buffer or similar structure of the type well known in the art to receive the voice packets, and arrange them in a proper sequence for playout at the receiver. These packets are carried as payload via the various bearer protocols of the protocol stacks of the two devices. It will be appreciated that non-QoS media transport protocols and/or other types of codecs (whether lossy or otherwise) may be used with equal success depending on the particular application.

Likewise, the foregoing process can run in reverse; i.e., packetized compressed data generated by the mobile device (e.g., a user speaking into their analog microphone, with the voice converted to digital and packetized for transmission over the Wi-Fi interface) can be received by the processor of the bridge device 130, decoded and converted back into analog form for transmission over the circuit-switched PSTN (or alternatively transmitted in modulated digital form such as via a narrowband or broadband modem).

The bridge device 130 may also include "answering machine" functionality of the type well known in the art. For example, where the bridge device is a user's PC, the indigenous V.90 56 Kbps modem could be used to answer and route calls to an answering machine application program running on the PC. This program may be equipped to store the incoming analog voice, or convert it to a compressed (e.g., CELP) format and store it in digital form. The application may also provide a user interface (e.g., GUI) whereby the user can listen to the message (e.g., via the speakers of the PC or another device such as a headset), have it converted to text such as via a speech-to-text algorithm of the type well known in the signal processing arts, delete it, etc.

In another variant, the bridge device includes software, firmware and/or hardware (e.g., an application running on the PC's CPU) adapted to push the call to the user device 120 (see e.g., the exemplary configuration thereof described subsequently herein with respect to FIG. 1G) when the latter is within range. For instance, a user who is away from their premises will not be able to establish WLAN communication between their user device 120 and the WLAN interface of the bridge device 130. An incoming PSTN call would then in this variant be stored at the premises (whether via an answering machine function of the bridge device 130 of the type previously described). When the user device 120 does in fact come in range of the bridge device 130 (and both are powered up), the WLAN interface of the bridge device 130 will receive communications from the now-associated STA (user device 120), thereby indicating its presence within the premises. This may also constitute e.g., an inter-process message or other signal being sent from the voicemail application running on the user device over the WLAN bearer initiating communication between the two devices at the application layer. At that point (depending on user configuration settings of the voicemail application running on the bridge device 130 and/or user device 120), the bridge device can "push" the stored voicemail to the user device 120 via the WLAN link (or, depending on configuration, the user device 120 can "pull" the data from the bridge device). The user device 120 can then either store the pushed/pulled content (e.g., within a voicemail or similar application running on the device), play it to the user via the user device's audio output, render it as text (e.g., when converted by a speech-to-text algorithm) on the user device display, etc. A copy of the stored and pushed/pulled message(s) can also be maintained on the bridge device 130 if desired. In one embodiment a visual voice mail application (e.g., Apple Visual Voice Mail) is utilized for this purpose. In one variant, premises voice mail can be pushed onto the bridge 130 device over e.g., IP, regardless of whether the phone is within Wi-Fi range or not. The exemplary voice mail application on the bridge device comprises the ability to differentiate the voice mail source (either incoming to the user's handset or incoming to a premises phone number), for example.

The aforementioned push/pull capability can also be utilized for transferring data or information other than voicemail, text messages, etc. For instance, in the exemplary context of the Assignee's iMac personal computer product, the "address book" data resident on that computer (here, acting as the bridge device 130) can be pushed/pulled from the bridge 130 to the user device 120, such that the user can access the address book data on the user device 120. This transferred data may also be stored locally if desired, or simply browsed remotely via the UI of the user device 120. See, e.g., the exemplary "MobileMe" service provided by the Assignee hereof, which stores user e-mail, contacts and calendars in a virtual "cloud", and sends updates to the user device. Changes that the user makes to contacts and calendars are propagated and updated rapidly (and vice versa), so the latest information is always available both at the user device and online (e.g., via web portal).

Likewise, an application running on the user device 120 can be configured to communicate with a corresponding application (or distributed component) running on the bridge device 130 so as to push/pull content from the user device 120 to the bridge device 130 (and beyond). For instance, a cellular voicemail or text message received at the user device 120 via the cellular interface can be stored locally within the cellular device, and pushed to the bridge device (e.g., the user may want to utilize the greater capabilities of the bridge device's unified mail application program to store/process the message, etc.).

In another variant of the invention, the WLAN interface of the bridge device 130 is configured to uniquely identify the user device 120 of one (or a group of) selected user, thereby: (i) avoiding neighbors or others in range with WLAN-enabled devices from inadvertently or surreptitiously gaining access to the voicemail application on the bridge device, and (ii) selectively providing wake-up functions for the selected user device(s) 120. In one embodiment, this identification includes a set of user-specified devices which are authorized to be "recognized" by the bridge device, such as by way of identification information relating to: (i) their hardware address (e.g., MAC); (ii) a cellular network identification or authentication value or vector; (iii) a Bluetooth "pairing" process, or any number of other mechanism for identifying (and optionally authenticating) a given user device to the bridge 130.

In another aspect of the invention, the bridge device 130 can be configured to automatically turn on or initiate either the application component (e.g., voicemail application previously described) on the user device 120, or both applications/components running on the bridge device 130 and the user device respectively. For instance, in one variant, the bridge device, upon detecting a communication or signal from the user device 120 over the WLAN PHY, requests identification information from the device (if not already transmitted). Once the user device 120 is identified and optionally authenticated, the bridge device 130 starts its voicemail "push/pull" software, and attempts to communicate with the corresponding application or component on the user device. If this communication fails, the bridge device 130 then formats and transmits a message over the WLAN interface to the protocol stack of the user device, the message when extracted and decoded causing initiation of the corresponding application or component. In this fashion, the negotiation and setup between the bridge device 130 and the newly arrived user device 120 for, inter alia, pushing/pulling messages or other data received over the PSTN is substantially seamless to the user, and does not require their intervention (e.g., manual initiation of the application via UI icons or menus on the user device 120). The user simply walks into their premises (and in range of their bridge device/AP) with at least the WLAN radio transceiver powered up on the user device 120, and the rest is automatic. The user can even opt to have the two communicating applications/components automatically push/pull any received messages or data directly to the user device if desired.

The PSTN interface 117 may also deliver narrowband modulated data signals, such as via the modem 132 of FIG. 1B comprising a V.34 or V.90 modem. Alternatively, the PSTN may be used for delivery of DSL (e.g., ADSL) broadband data signals, including without limitation packetized IP data transmitted over the PSTN copper wire in the form of modulated signals.

In one exemplary embodiment (FIG. 1C), the bridge device 130 is a stand alone box or device that is placed within the premises proximate to a PSTN wall jack (e.g., RJ11), and which includes a wireless interface (e.g., WLAN AP 118) for communication with a user's mobile handset or receiver. In one configuration, the PSTN connection and modem 132 is used merely for voice or narrowband data communication (e.g., via V.34 or V.90 modem), and this voice or data is converted as needed and passed via the wireless interface to the mobile device as previously described. Alternatively, the modem 132 may comprise a DSL modem and filter, thereby allowing simultaneous carriage of voice band and data band (broadband) signals. Accordingly, in this latter configuration, the processor 134 and AP 118 can carry both compressed voice and broadband data to the mobile handset simultaneously using the voiceband (e.g., up to 20 KHz) and data band (above 20 KHz), respectively.

In another configuration (FIG. 1D), the bridge device 130 includes a universal serial bus (USB) or FireWire (IEEE-Std. 1394) "dongle" or key 181 that plugs into the complementary port 184 of a user device such as a laptop or desktop computer 186, the latter being connected to a broadband Internet connection (e.g., ADSL, via the PSTN, DOCSIS modem, Fiber to the Home, or FTTH (e.g., Verizon FiOS) system, etc.). In one variant of the dongle bridge device 130, the dongle 181 includes a wireless networking interface (e.g., Wi-Fi transceiver) 118 of the type well known in the art for communication with the user mobile device when the two are within sufficient range. The dongle is plugged into an available USB or 1394 port on the user's PC, the latter which is coupled to the PSTN via e.g., a narrowband or broadband modem. The device receives for example analog calls from the PSTN via the USB/1394 port, digitizes and encodes them (or allows the host device into which it is plugged to perform such conversion, depending on the processing and other capabilities indigenous to the dongle 130), and then transmits this digital data in the form of packets over the dongle's wireless interface to a proximate UE or handset. It may also receive communications from the UE/handset and transmit them over the PSTN, as previously described herein.

In another alternative configuration (FIG. 1E), the dongle includes an "in-line" type device (form factor generally akin to a residential broadband ADSL filter), with an RJ11 connector or other PSTN-compatible interface on one end. The dongle incorporates a wireless (e.g., WLAN) interface 118 for communication with the mobile device, and may be configured as minimally or feature-rich as desired. For instance, in one variant, the dongle includes a DSP with codec/compression algorithms to digitally render the analog PSTN voice signals; no modem is required in this configuration. "Answering machine" functionality is provided by an application running on the mobile device (as opposed to being disposed within the dongle). The dongle in this embodiment is line-powered, akin to a traditional POTS telephone.

Alternatively, the dongle may be equipped with a narrowband or broadband modem, thereby allowing the dongle to provide enhanced services to include data as well as voice.

In another variant (FIG. 1F), the in-line dongle may be equipped with a second PSTN/POTS interface for connection to a PC or other such device with a modem. The dongle of this variant effectively intercepts voice band (and/or data band) signals coming in over the PSTN line, and converts and transmits them via its wireless LAN interface to the UE or mobile handset. Likewise, digital wireless signals from the UP/mobile handset are received at the WLAN interface 118 and converted to voice band signals for transmission over the PSTN. To this end, the dongle may also be combined with an ADSL filter of the type well known in the telephony arts so as to facilitate filtration and/or splitting as required so that, e.g., the connected PC or other device downstream from the dongle 130 can utilize the un-intercepted band signals.

Figure 1C:
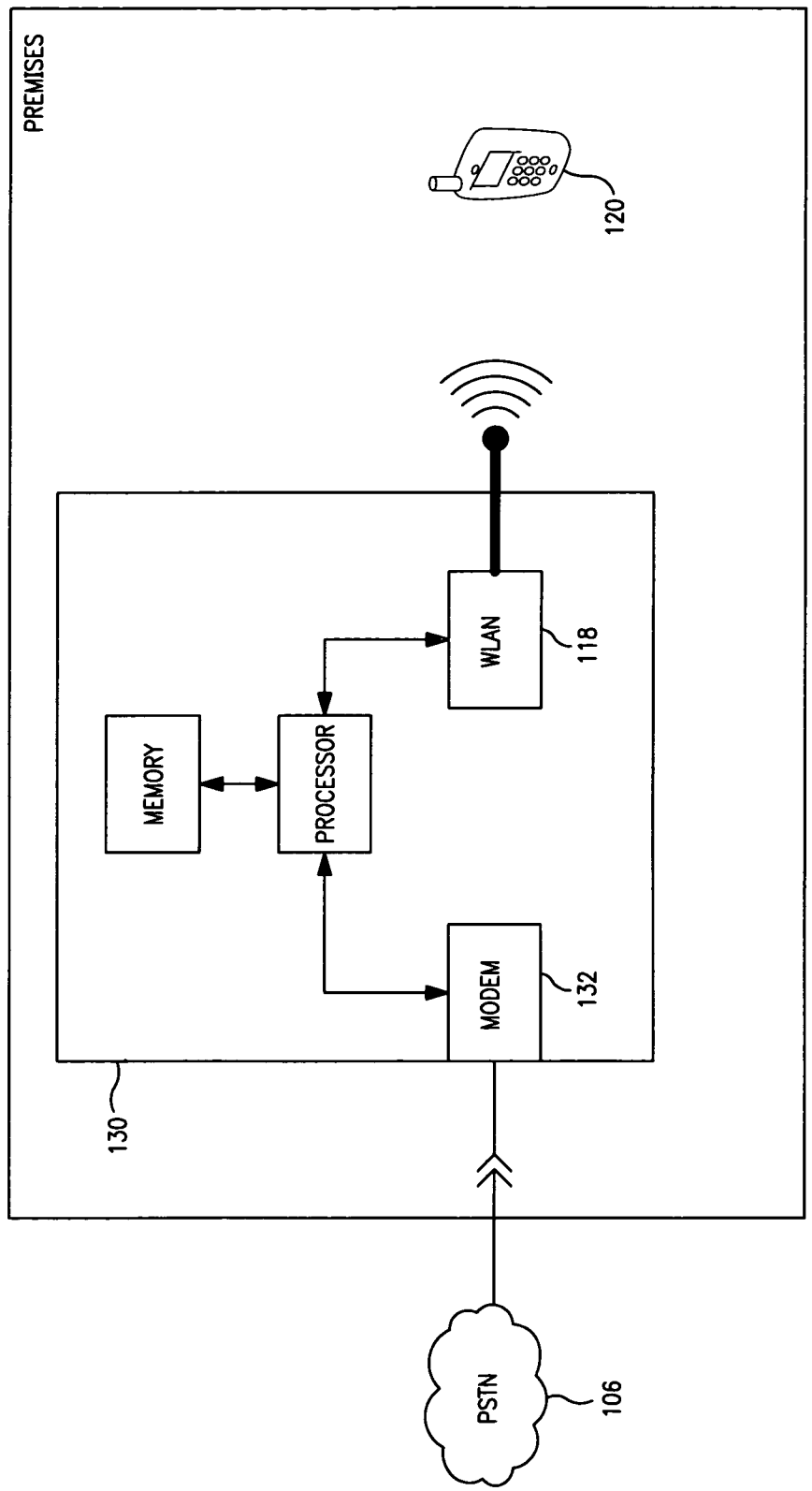
FIG. 1C is a block diagram illustrating one embodiment of the bridge device of the invention, comprising a stand-alone box.
Figure 1D:
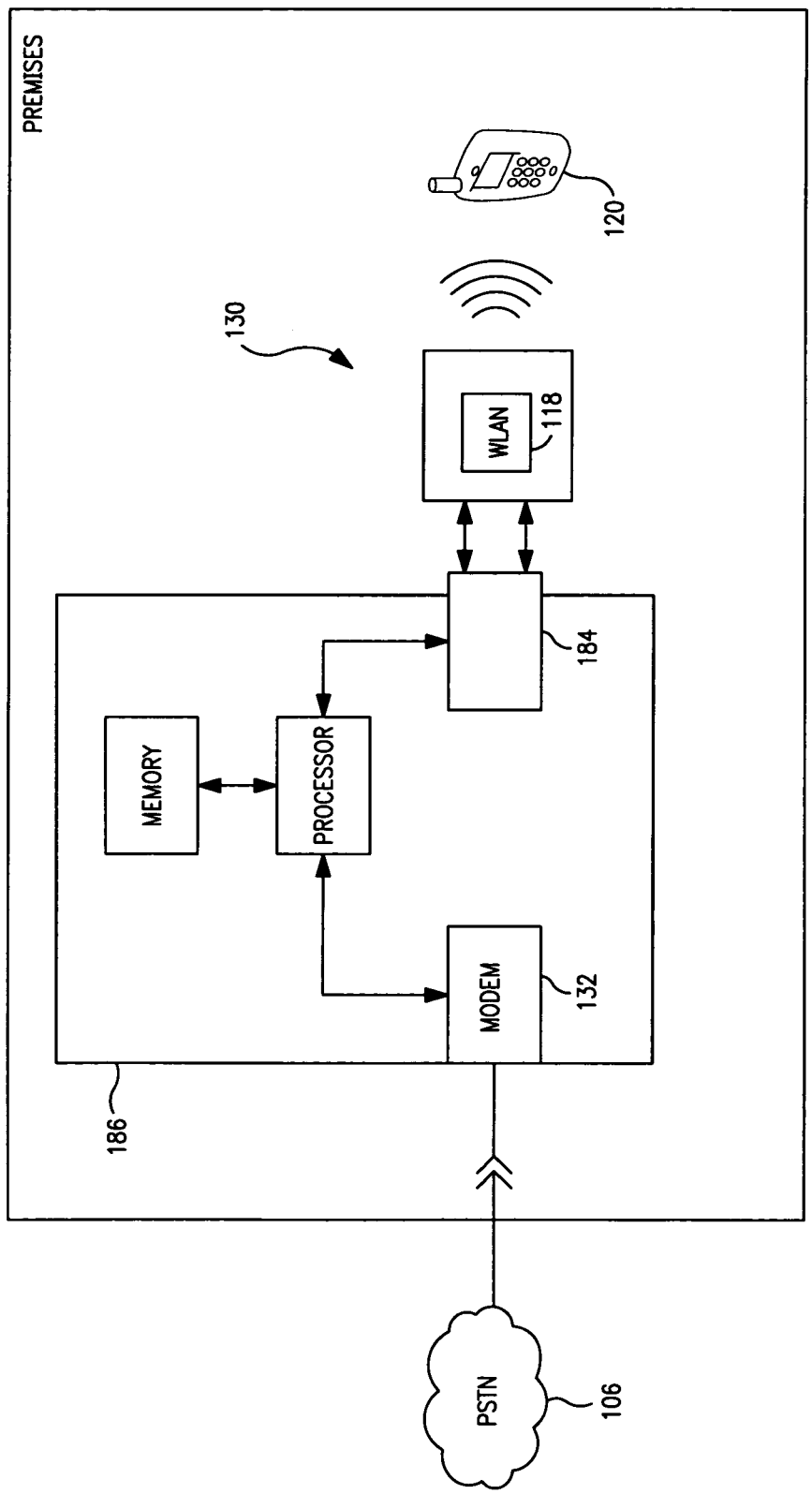
FIG. 1D is a block diagram illustrating one embodiment of the bridge device of the invention, comprising a wireless dongle.
Figure 1E:
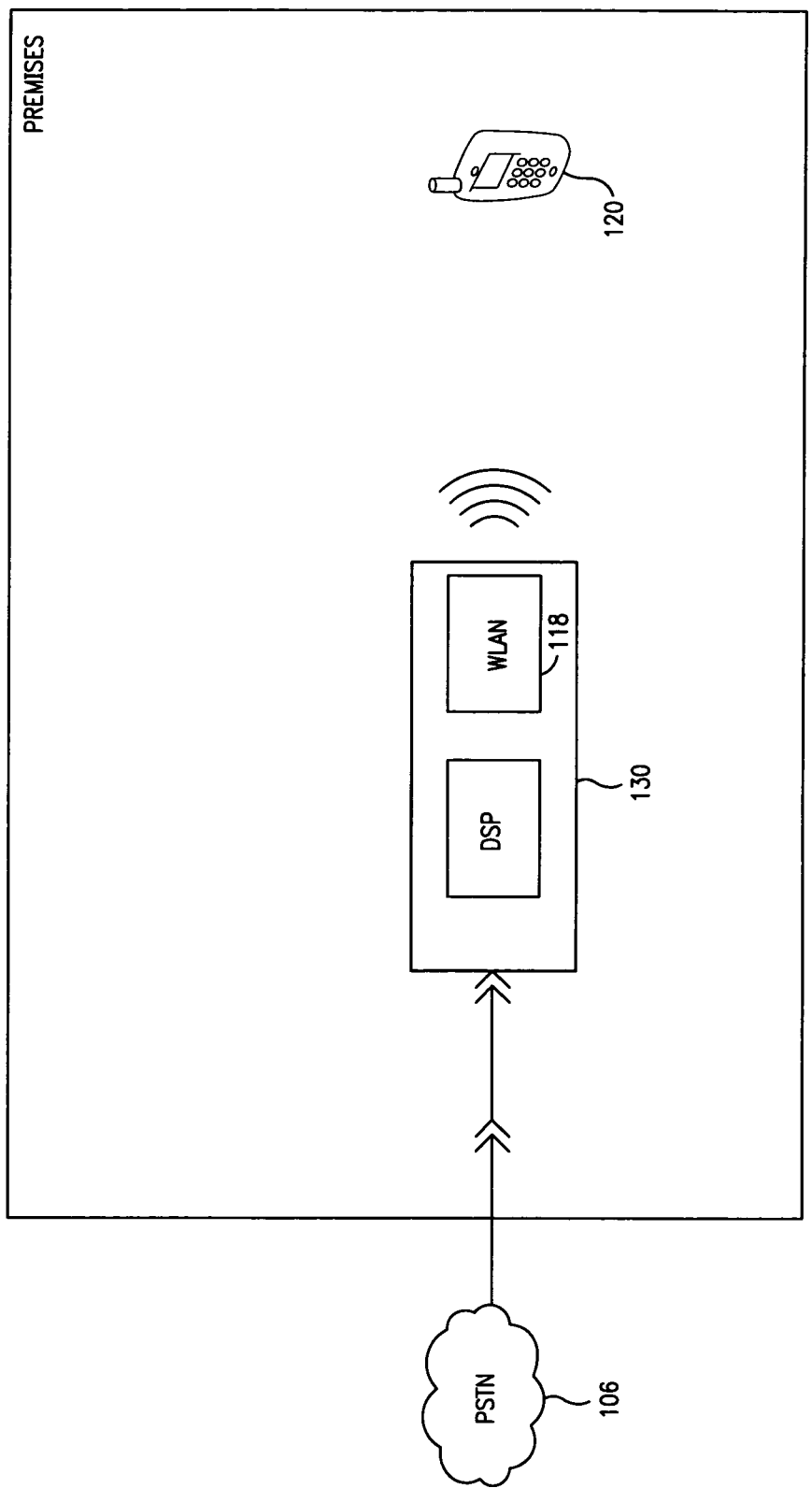
FIG. 1E is a block diagram illustrating one embodiment of the bridge device of the invention, comprising an in-line device.
Figure 1F:
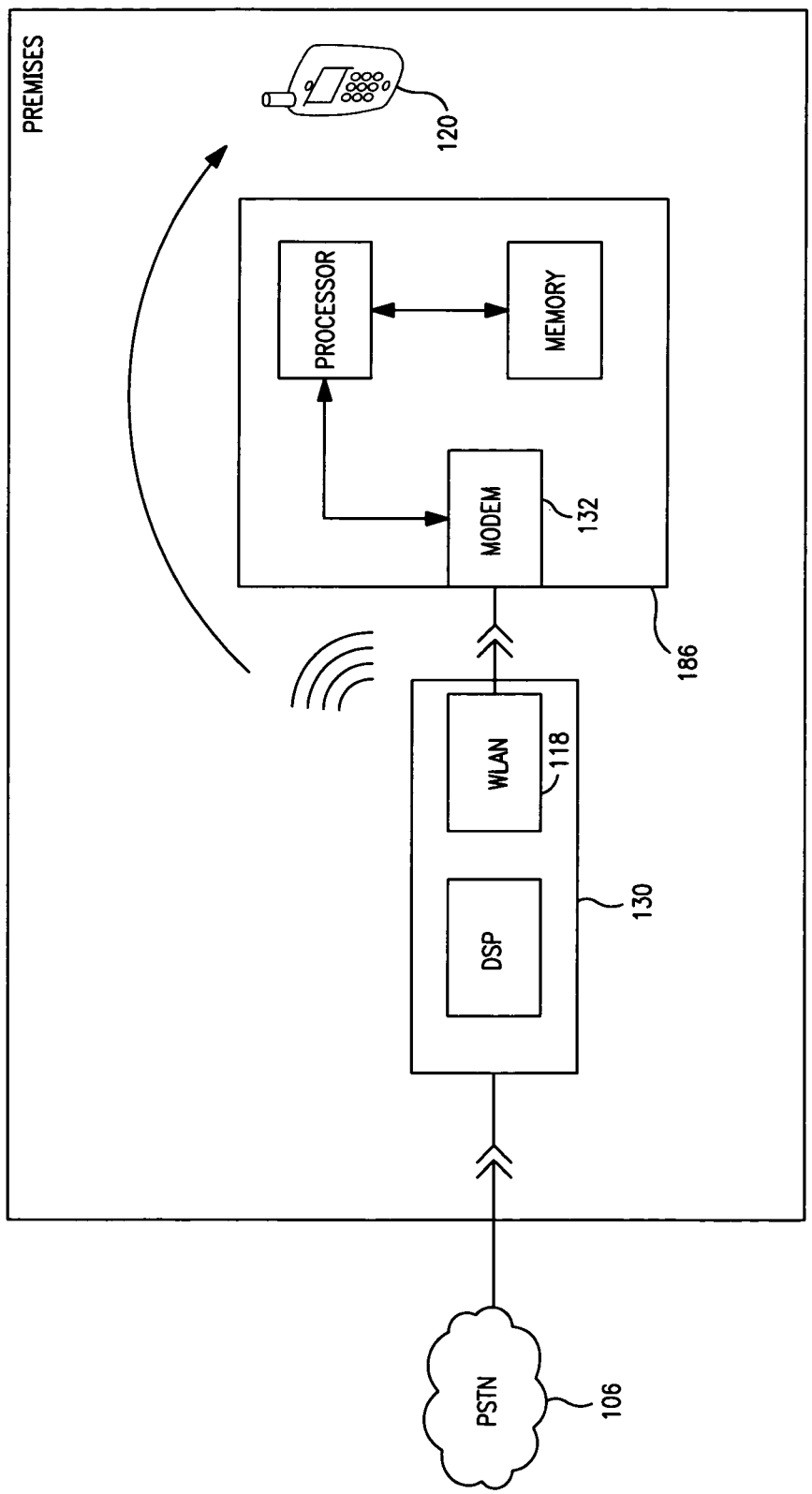
FIG. 1F is a block diagram illustrating a second embodiment of the in-line bridge device according to the present invention.
Figure 1G:
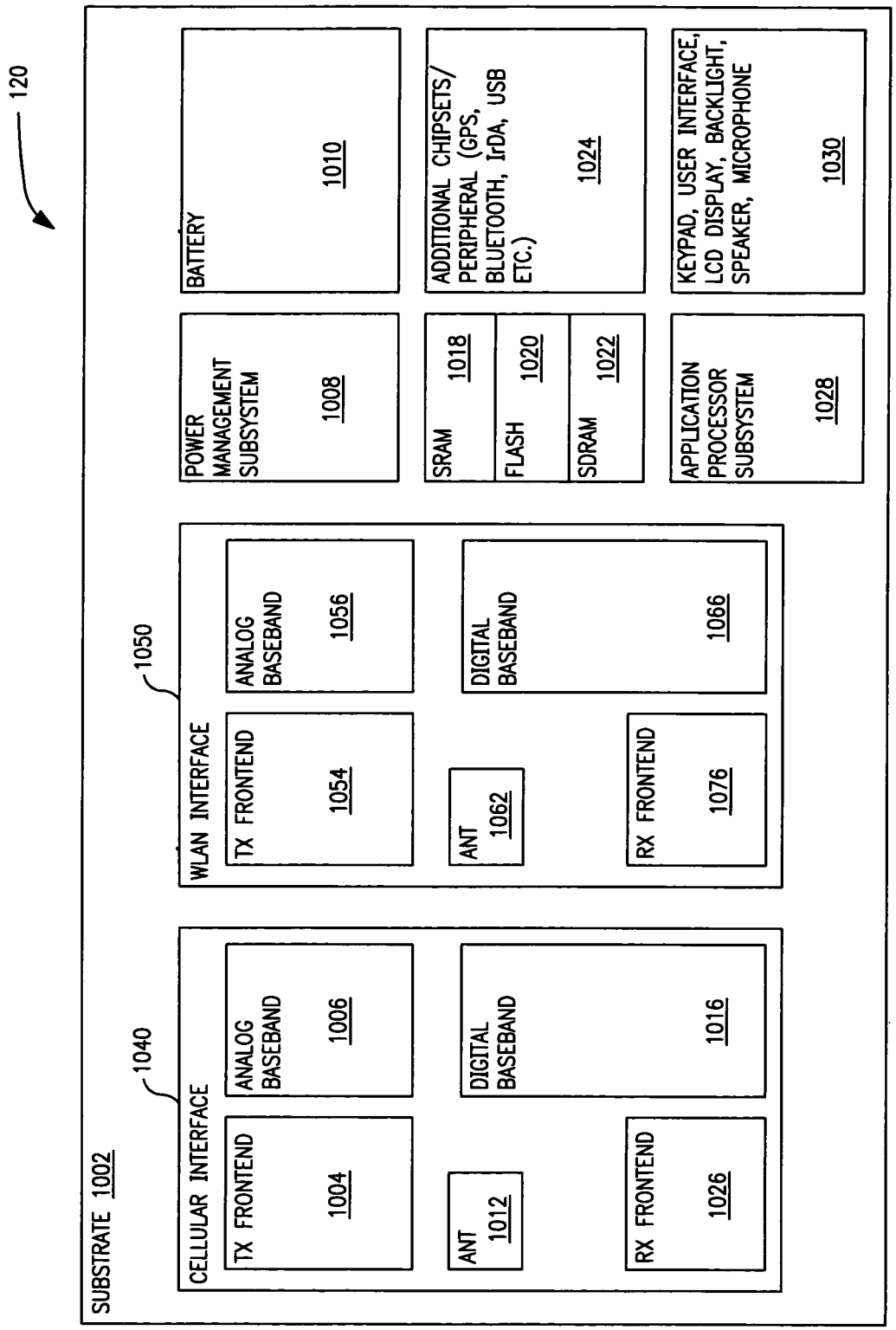
FIG. 1G is a block diagram illustrating one embodiment of a user IP device apparatus configured to implement the methods of the present invention.

Referring now to FIG. 1G, exemplary user device 120 useful in implementing the methods of the present invention is illustrated. In one embodiment, the apparatus disclosed s, inter alia, a UE or mobile device such as a portable computer or mobile communications handset (e.g., cellular "smartphone", PDA, or the like) capable of communicating over two or more wireless protocols (e.g., Wi-Fi and/or WiMAX, and 3G UMTS). Moreover, while the user device is referenced herein as that device 120 shown in FIG. 1 as part of the "local" or "cellular" networks, it will be appreciated that this convention is merely adopted for convenience and clarity, and in fact the user device of the invention may comprise any number of different form factors and capabilities (e.g., it could also comprise the "remote" device 110 or the UE 116 of FIG. 1).

The user device 120 includes, in the illustrated embodiment, an application processor subsystem 1028 such as a digital signal processor, microprocessor, field-programmable gate array, or plurality of processing components mounted on one or more substrates 1002. The processing subsystem may also comprise an internal cache memory of the type known in the art. The processing subsystem 1028 is connected to a memory subsystem comprising memory (e.g., one or more of SRAM 1018, flash 1020, SDRAM 1022, ROM, PROM, EEPROM, DRAM, SDRAM, DDR/2 SDRAM, EDO/FPMS, RLDRAM, SRAM, "flash" memory (e.g., NAND/NOR), PSRAM, etc.) components. The memory subsystem may also implement DMA type hardware, so as to facilitate data accesses. The memory subsystem may also further comprise application programs, such as the exemplary voicemail, "push/pull", or other applications discussed elsewhere herein.

The cellular radio/modem subsystem 1040 of the illustrated device 120 includes a digital baseband 1016, analog baseband 1006, RX frontend 1026 and TX frontend 1004, as well as an antenna assembly 1012. While a specific architecture is discussed, it is appreciated that in some embodiments, some components may be obviated altogether or alternatively merged with one another (such as RF RX, RF TX and ABB combined, as of the type used for 3G digital RFs) as would be appreciated by one of ordinary skill in the art given the present disclosure.

The illustrated power management subsystem (PMS) 1008 provides power to the user IP device, and may comprise an integrated circuit and or a plurality of discrete electrical components. In one exemplary portable user IP apparatus, the power management subsystem 1008 advantageously interfaces with a battery 1010. As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

The user interface system 1030 includes any number of well-known I/O including, without limitation: a keypad, touch screen, LCD display, backlight, speaker, and microphone. However, it is recognized that in certain applications, one or more of these components may be obviated. For example, modular (e.g., PCMCIA card type) UE embodiments (not shown) may lack a user interface, as they could piggyback onto the user interface of the host device to which they are physically and/or electrically coupled.

The illustrated user device 120 also includes a second wireless transceiver 1050. In one embodiment, this second transceiver 1050 includes a WLAN (i.e., IEEE Std. 802.11 or Wi-Fi) transceiver of the type well known in the wireless arts. In one variant, the user device 120 operates as a Wi-Fi station (STA), and the bridge device as an access point (AP), the latter providing access over the PSTN and/or broadband connection of the premises. The illustrated WLAN radio/modem subsystem 1050 of the illustrated device 120 includes a digital baseband 1066, analog baseband 1056, RX frontend 1076 and TX frontend 1054. The apparatus 120 further includes an antenna assembly 1062. As noted for the cellular interface, alternate embodiments of the WLAN interface 1050 may have more or less components than that configurations shown, and/or merge components with one another (such as RF RX, RF TX and ABB combined, etc.) as would be appreciated by one of ordinary skill in the art given the present disclosure.

The apparatus 120 further includes optional additional peripherals 1024 including, without limitation, one or more GPS receivers or transceivers, or network interfaces such as IrDA ports, Bluetooth transceivers (e.g., compliant with Bluetooth Core Specification Version 1.2, Version 2.0, and Version 2.1+EDR, etc.), USB, FireWire, etc. It is however recognized that these components are not necessarily required for operation of the user device in accordance with the principles of the present invention.

Alternate Embodiment—WiMAX

Another form of wireless technology named WiMAX (Worldwide Interoperability for Microwave Access, embodied without limitation in any of the variants of IEEE Std. 802.16, including IEEE Std. 802.16e-2005 (Mobile 802.16); IEEE Std. 802.16f-2005 (Management Information Base); IEEE Std. 802.16g-2007 (Management Plane Procedures and Services), and IEEE Std. 802.16k-2007 (Bridging of 802.16—an amendment to 802.1D), each of the foregoing being incorporated herein by reference in its entirety)), provides wireless transmission of data using a variety of transmission modes, including point-to-point links and portable Internet access. Currently, WiMAX provides up to 75 Mb/s symmetric broadband speed over a wireless OFDMA PHY. While described primarily as a technology enabling the delivery of "last mile" wireless broadband access as an alternative to cable and DSL, WiMAX has other uses including inter alia: (i) connecting Wi-Fi hotspots or other nodes to network infrastructure such as the Internet; (ii) providing data and telecommunications services such as "VoIP", even in place of cellular networks which have a much greater infrastructure investment; and (iii) providing alternate sources of Internet connectivity. WiMAX connectivity can be both of a fixed nature and mobile/portable nature. WiMAX is not so much a replacement for the Wi-Fi technology described previously herein, but rather largely complementary in nature due to its much greater range (typically on the order of several miles), and other physical properties. For example, a WiMAX network might conceivably provide user coverage over an entire metropolitan area, versus a patchwork of Wi-Fi "hotspots" at various limited locations within that metropolitan area.

In another embodiment of the invention, a WiMAX (i.e., IEEE Std. 802.16) transceiver (not shown) is resident on the user device 120, whether in conjunction with or in place of the aforementioned WLAN/Wi-Fi transceiver 1050. The WiMAX interface, as previously described, provides enhanced range over that of the WLAN interface (which is typically limited to perhaps a few hundred feet depending on location, environment, interfering signals, etc.). This is also advantageous from the standpoint that cellular coverage may not exist in a given area, but WiMAX coverage might. It also obviates having to implement a "call forwarding" arrangement as required under the traditional, but still provides enhanced ranges comparable to cellular coverage (and avoids any charges associated with use of the latter).

One variant of this embodiment employs a WiMAX transceiver within the bridge device 130 and also one in the user device 120, such that the two devices can communicate in similar fashion to the WLAN embodiments previously described, yet over extended distances (e.g., if a user leaves his premises to go to a neighbor's house which is a mile away, and takes his user device 120 with him). Incoming PSTN voice calls, for example, are converted to digital representations (compressed), and then transmitted from the bridge device's WiMAX interface to the user device WiMAX transceiver 1050, and vice-versa.

Figure 1H:
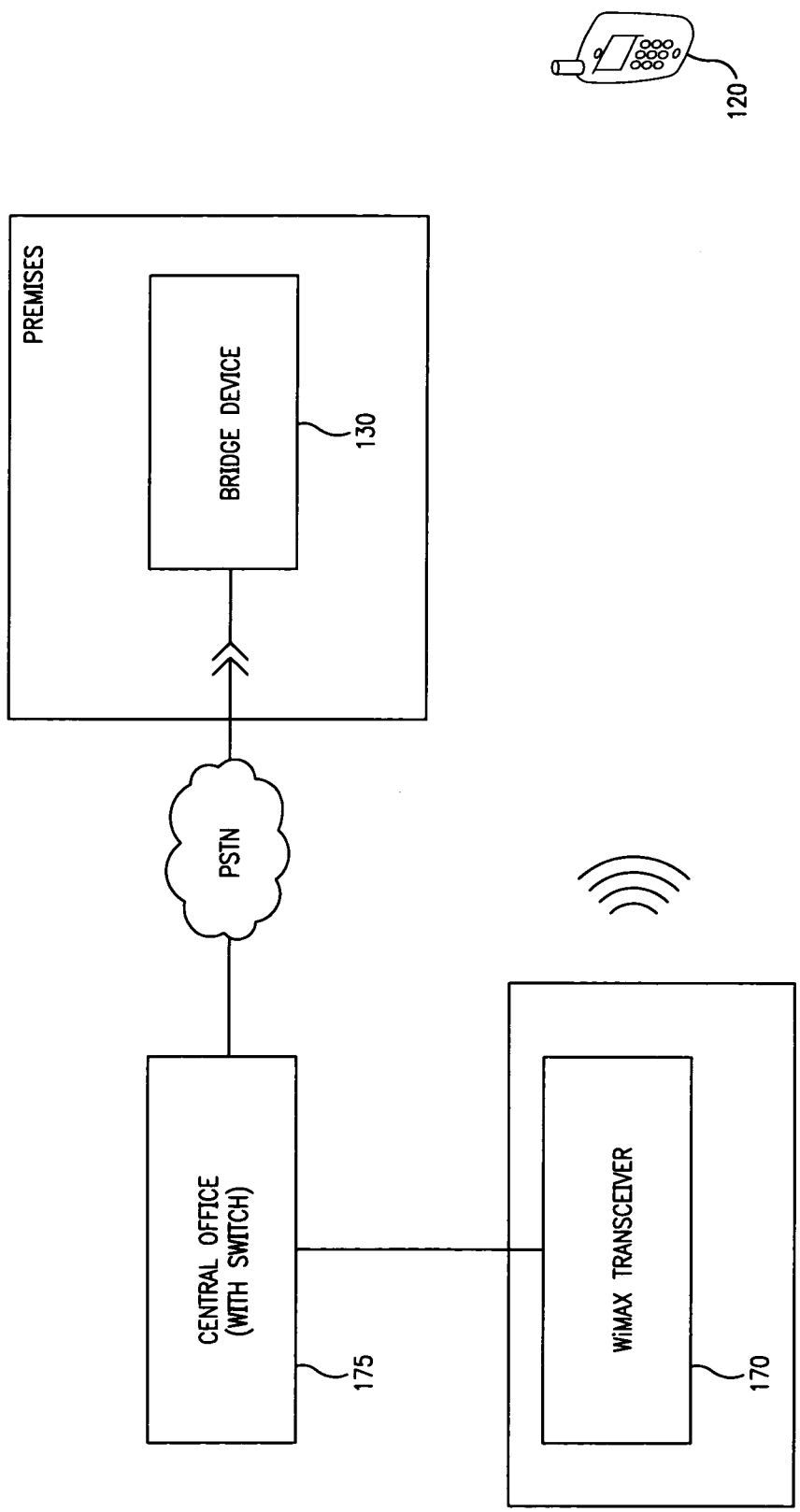
FIG. 1H is a block diagram illustrating one embodiment of a longer-range (e.g., WiMAX) based configuration according to the invention.

In a second variant (FIG. 1H), a remote WiMAX transceiver 170, such as one operated by a service provider and disposed at a centralized location (e.g., service provider facility, PSTN switching facility, cellular base station, etc.) is utilized to communicate with the user device 120. In this variant, the user's incoming PSTN call is routed to the WiMAX apparatus 170 and transmitted to the user device 120, which may be at the user's premises 171, or alternatively outside of the premises. Where required (e.g., for conversion of an incoming voice call), the compression or vocoding can be performed at the WiMAX transceiver apparatus location (e.g., using a call processing subsystem of the type common to cellular networks), or alternatively can be performed at another location such as at the PSTN telecommunications switch 175 (e.g., on a board or card module within the switch, akin to a prior art conferencing board). The call may also be split and sent in parallel to both the user's premises 171 (e.g., the bridge device 130 or a simple user answering machine) and the WiMAX distribution node 170 if desired. Calls can also be routed according to different logic; e.g., if the call routed to the WiMAX transceiver 170 can be completed and connected (and hence received by the user device 120, or at least deposited in storage via a voicemail application resident thereon or otherwise located in the network), then the need to route the PSTN call to the user's premises in obviated. Alternatively, if the call cannot be routed/connected via the WiMAX transceiver, such as when the user device 120 is out of range, then the call is routed via the PSTN to the user's premises, where the user's answering machine or bridge device 130 can handle the call.

In another variant, the user device includes both WiMAX and WLAN interfaces, and the premises bridge device 130 is configured to determine whether a given user device 120 (as determined by e.g., its unique ID previously described herein) is located at the premises or not, thereby allowing for "intelligent" call routing via the appropriate interface. For example, the aforementioned detection may be accomplished simply by the (powered on) user device 120 establishing itself as a WLAN STA with the AP of the bridge device 130 when it comes in proximity thereof, or alternatively via completion of a Bluetooth pairing or bonding process (and subsequent exchange of the unique ID information for the user device 120). An application running on the bridge device then determines whether the PSTN call should be routed to the WiMAX transceiver; i.e., if the user is present at the premises, the PSTN call is accepted at the bridge device 130 and routed as previously described via the WLAN interface to the user device 120. If the user is not present, the bridge device signals the WiMAX interface to transmit the call/data. Depending on the location of the WIMAX interface, this may be as simple as inter-interface signaling within the bridge device 130 itself (i.e., when the WIMAX interface is located within the bridge device 130), or alternatively signaling to a remotely-located WIMAX interface (FIG. 1H) via wired or wireless means. For instance, in-band or out-of-band signaling such as DTMF or SS7 can be used by the bridge device to communicate with the upstream PSTN telecommunications switch to route the call to the WIMAX node 170. Other signaling mechanisms can be used as well, as will be appreciated by those of ordinary skill in the telephony arts.

As an alternative to the use of the WiMAX or other interface for greater area coverage/range, another variant of the invention allows the bridge device 130 to be programmed to intelligently locate the user. For instance, the bridge device can be pre-programmed with a list or hierarchy of different possible locations where the user might (characteristically) be at any given time, and the network address of the associated or proximate WLAN "hotspot" or other interface if available. For instance, as illustrated in Table 1 below, the application software on the bridge device 130 can be programmed to enter the Table at the first entry ("Office") upon an unsuccessful attempt to connect the call at the user's primary premises. The call (in the form of packetized data formatted for transmission over a packet switched IP network such as the Internet) is then routed via the broadband or other Internet connection (to include even the data band of the PSTN line on which the call was received, such as via an ADSL modem) to the first location (here, the user's office) on the alternate table. If no connection is achieved at the office, the packets are then forwarded to the second location, and so forth. Alternatively, for reduced latency, the packets can be broadcast to each of the multiple IP addresses within the hierarchy simultaneously.

TABLE 1

| Order/Rank | Description | Address |
|---|---|---|
| 1 | Office | 192.155.005.002 |
| 2 | Brother's house | 187.124.232.003 |
| 3 | Mom's house | 145.332.005.017 |
| 4 | Beach house | 121.006.023.044 |

At each recipient node (e.g., at the node serviced by each IP address in Table 1), the WLAN interface at that node (which in one embodiment includes the target IP address in Table 1, although this is not a requirement) attempts to establish a connection with the user device 120 for the designated user, and route the call packets thereto. At three of the four alternate nodes, no connection will be established (since the user can only be in one place at one time), but at the fourth, the connection will succeed and after identification/authentication, the packets can be routed to the user device application. In this fashion, the invention advantageously leverages the ubiquitous nature of extant Internet and WLAN "hotspot" infrastructure to deliver a PSTN call directed to a user's home number to that user's mobile device 120 without use of the cellular interface or a second (e.g., WiMAX) interface.

Security—

It will also be recognized that the bridge device 130 and/or user device 120 of the present invention may optionally support one or more security features such as virtual private networking (VPN), akin to any other VPN-enabled device operating over an untrusted IP network. Specifically, in one variant, a VPN client application is operative to run on the bridge device 130, and communicate with another counterpart application on a remote node across the remote IP network (e.g., the Internet, MAN, WAN, etc.). Security features which may be inherent to the WLAN or other wireless connection between the bridge device 130 and user device 120 (e.g., WEP, WPA/WPA2/IEEE Std. 802.11i, IEEE Std. 802.1x, AES/DES encryption, etc.) may be used if required to support data integrity, authentication, and/or confidentiality requirements as needed between the bridge and the user device, and the VPN "tunnel" used to protect the communications between the bridge device and the distant endpoint(s). Alternatively, VPN can be run on the user device 120, with the link between the user device and the bridge being treated as "untrusted". Various other configurations will be recognized by those of ordinary skill given the present disclosure.

Methods—

Figure 2:
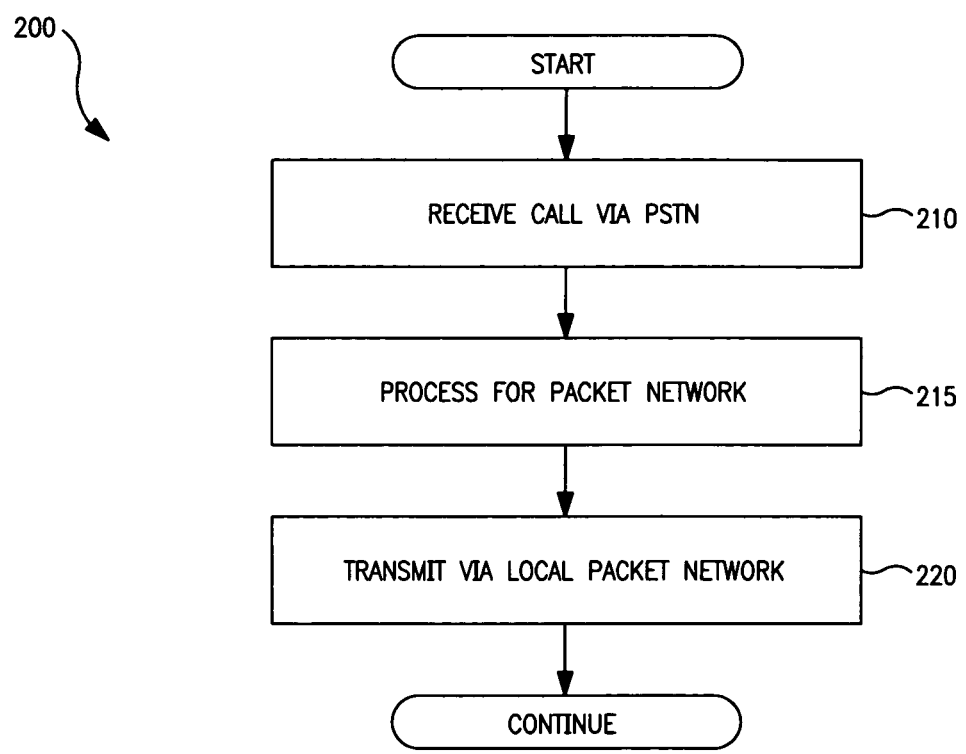
FIG. 2 is a logical flow diagram illustrating one embodiment of a method for receiving PSTN/POTS calls, and forwarding those calls onto a local IP network in accordance with the principles of the present invention.

Referring to the exemplary bridge device apparatus 130 (FIG. 1C) described above, a first embodiment of a generalized process 200 (FIG. 2) for making use of the bridge device architecture is shown and described in detail. Specifically, FIG. 2 illustrates a generalized process for taking phone calls received via an analog network (such as a PSTN) and transmitting that received phone call over a packet based network (such as a local IP-based WLAN network). The generalized process begins at step 210 wherein the bridge device 130, attached to a PSTN network interface, receives an incoming telephone call. The ability of the bridge device to receive calls may, in an exemplary embodiment, be controlled by an on/off switch (whether implemented in hardware or software) that permits a user to decide whether the bridge device should be allowed to receive and subsequently process any received calls. Preferably, this feature is handled in an automated fashion according to a set of predetermined rules specified by the user or the device manufacturer. For example, a user may simply wish to have the bridge device receive and process all calls received via a local PSTN network interface, or only those received within certain time periods, etc. The voicemail/bridge application running on the bridge device 130 can be programmed by the user accordingly, such as via a GUI on the display device of the bridge.

Moreover, the call routing "switch" can also be controlled based on detection of the user device 120 within proximity of the bridge device 130; e.g., when the user arrives home from work, the bridge detects the user device as previously described, and causes the switch to route all incoming PSTN calls over the packet network (e.g., WLAN interface) versus to a simple answering machine or other apparatus within the premises.

Alternatively, the user might designate a call list which in turn designates a number/identity of contacts the user wishes to have processed by the bridge device 130. The bridge device will detect an incoming call, decode the caller identification information, determine whether the caller identification information matches with a contact on the designated call list, and handle the call appropriately. Such an implementation would be desirable as unwanted calls (such as unwanted marketing calls) would not be forwarded onto the user, while other wanted calls (such as a phone call from a close friend) would be forwarded on to the user device 120. Any number of other rules will be recognized and can be implemented by those of ordinary skill given the present disclosure.

At step 215, the received call is processed in order to comply with applicable IP packet or other protocols (e.g., compressed into a digital format such as for instance CELP, and then packetized according to the bearer transport and network protocols), and transmitted onto the local packet network such as via the WLAN interface previously described (step 220). In one exemplary embodiment, a user device 120 (such as the exemplary iPhone™) can then detect the transmitted call over the WLAN, and signal the user that an incoming call is being received (e.g., by audible ring tone, flashing or modulating light or display intensity level, vibration, etc.). The user can then answer the call and conduct a telephone conversation with the caller via the bridge device, local WLAN network and the attached PSTN. In an exemplary implementation, the bridge device will forward on the decoded caller identification information over the IP network so that a user of the user device 120 can readily identify the caller to the user before the user decides to answer or not.

In an alternative embodiment, the bridge device will transmit the converted voice call and/or data to another user device (such as the exemplary Apple TV device, which may also be physically integrated with the bridge device 130) which can subsequently generate and display the call information on a display such as the user's television set (e.g., via an HDMI or other interface between the Apple TV device and the users' HDTV). For instance, a small icon or display box is generated on the user's display, indicating the Caller ID number if applicable, and optionally indicating other information such as the source (e.g., PSTN, the called number, etc.). Audible cues can be used as well, whether in conjunction with the visual display or by themselves. The user can then elect to answer the phone call via a traditional analog phone (attached to the user's PSTN network interface) or via the user's designated IP/WLAN device (such as an exemplary iPhone).

Similarly, audio services (e.g., the exemplary iTunes service provided by the Assignee hereof) may be used as the portal for communication with the user regarding the existence of an incoming voice or data call. Specifically, in one variant, music or other audio being streamed (e.g., via WLAN) or played out of the user's personal media device or PMD (e.g., the exemplary iPod Touch device manufactured by the Assignee hereof) can be interrupted, modulated in amplitude, frequency, and/or other parameters, or additional sounds (such as a simulated analog telephone ring tone, musical clip/ring tone, etc.) generated and played along with the primary (audio) content as a cue to the user. Lighting or other attributes on the PMD can also be varied, modulated, etc. to provide a visual cue along with or in place of the audio cue(s).

In yet another variant, a user can be alerted (via their user device 120) of an incoming teleconference or video conference (e.g., H.323/H.245, Apple iChat, or similar) received over the bridge device PSTN or broadband connection. For example, in one embodiment, a conferencing application running on the bridge device 130 is used to receive and process session requests received over the PSTN or broadband connection, and generate a cue (e.g., message, signal, interrupt, etc.) to be sent to the user device 120 to alert the user as to the incoming video conference. In one variant, the bridge device is a user's PC (e.g., iMac computer) which alerts the user device 120 via its WLAN interface, such as by ringing, vibration, visual cues, etc. If the user device is sufficiently enabled (e.g., has audio/video hardware such as a microphone, camera, etc.) and conferencing software supporting the requisite protocol, then the conference can even be conducted via the user device 120 over the WLAN or other interposed LAN connection.

In another exemplary embodiment, the user device 120 will utilize a local wireless network in order to communicate with the bridge device 130. In some instances, where the user device 120 will be relatively small in size, especially where that device is expected to be portable (e.g., smartphone). While it is estimated by the inventor hereof that a typical WLAN radio consumes on the order of 100 mA of electrical current during typical "standby" operation, it may sometimes be acceptable from a power conservation standpoint to allow the radio to remain in this state indefinitely. However, in certain situations, it may be undesirable for the user device radio to remain active and connected with the local wireless network continuously.

Figure 2A:
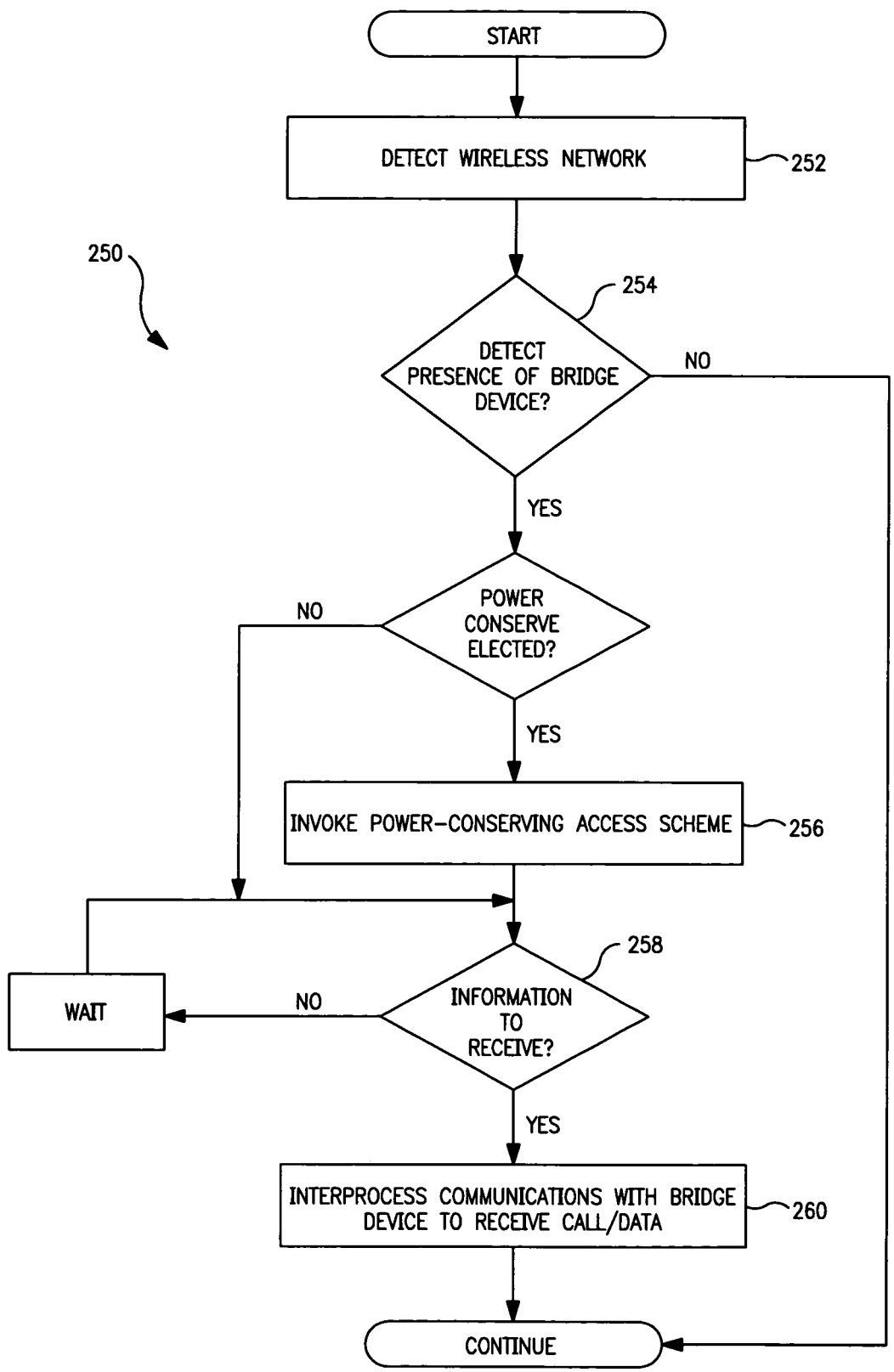
FIG. 2A is a logical flow diagram illustrating one embodiment of a method for implementing periodic polling by the user IP device of FIG. 1D in order to enable communications with the bridge device of FIG. 1C.

Accordingly, FIG. 2A illustrates one embodiment of a method 250 for accessing the wireless network to detect whether there is information to receive, so as to conserve on electrical power within the mobile device.

At step 252 of the method 250, the user device 120 will automatically detect the presence of a wireless network. In one embodiment, this happens as a result of a user entering the wireless network coverage area of the wireless network with their WLAN radio interface operating (at least to a sufficient level to allow for communication between the bridge device 130 (e.g., Wi-Fi AP) and the user device 120 (e.g., Wi-Fi STA)). Alternatively, the user device and/or the bridge device may be dormant when brought into proximity of one another, and then subsequently activated at which time discovery occurs.

At step 254, the user device attempts to detect the presence of the premises bridge device 130 within the wireless network detected at step 252. This is, in an exemplary embodiment, accomplished via inter-process communication between the voicemail application (client) running on the user device 120 and the corresponding application/component running on the bridge device (if present). For instance, the client device (or bridge device), once in communication via the WLAN PHY, could send a request message to the other device to elicit a desired response (e.g., ACK, return of ID/authentication information, etc.). Failing receipt of the proper response, the initiating application would conclude that either: (i) the user device 120 that is part of the network is not the user device of an authorized user (e.g., the owner of the premises), or (ii) the AP with which the authorized user's device 120 is associated in not the bridge device 130. In one variant, the bridge device does not create its own wireless network, but rather utilizes an existing Wi-Fi wireless network. Discovery of the bridge 130 by the user handset can be accomplished by a number of techniques (e.g., generally similar to that used by the exemplary Bonjour protocol, or the approach of the iTunes service in discovering remote devices associated with an user handset such as an iPhone).

If the bridge device is not discovered, then the operation of the user device 120 continues on as normal. If however, the bridge device 130 is discovered, then a power-conserving access scheme (e.g., periodic polling) is automatically implemented on the user device (FIG. 1D) at step 256. For instance, in one variant, a controller or algorithm tasked with control of the WLAN radio can be modified and used for this purpose (extant WLAN implementations according to IEEE Std. 802.11 do not have such power conservation capability).

The exemplary periodic polling scheme modifies how often the user device 120 will activate its WLAN radio (or portions thereof) to look for messages sent by the bridge device 130. This is particularly useful, for example, where a user wishes to conserve power on their user device, and hence not remain constantly connected to the wireless network (such as the case for many existing wireless protocols such as IEEE Std. 802.11). Polling in existing wireless protocols occurs relatively frequently (e.g., on the order 10's or 100's of milliseconds), whereas that of the power conservation polling scheme is one the order of a second, which corresponds to the standard telephone call ring frequency. Accordingly, if a user does not wish to remain connected continuously to a wireless network, the periodicity of the polling (i.e., enabling the relevant portion(s) of the WLAN radio to detect the incoming message) is substantially increased in order to reduce device power consumption. It will also be appreciated that only those portions necessary to receive and decode the incoming message need be powered up; other ancillary functions can be placed in a "sleep" mode so as to further conserve power.

The actual poll duration of the radio once energized may be set to only that needed to detect the message (if present). This may be appreciably less than the polling interval (e.g., one second), such that an asymmetric poll cycle is created (e.g., one second off 0.02 seconds on, one second off, and so forth).

At step 258, the user device determines whether or not there is information to receive from the bridge device 130. If not, the user device will continue running the power conservation (e.g., periodic polling) scheme. In an exemplary embodiment, this functionality will automatically stop after the user device 120 can no longer detect the bridge device 130 over the local IP network, or is affirmatively instructed to terminate (e.g., terminate power conservation mode, such as via a software switch in a control application, etc.).

However, if the user device 120 does detect that there is information to be received from the bridge device, the user device and the bridge device will conduct inter-process (e.g., application layer to application layer) communications at step 260 to enable unidirectional or bidirectional data transfer (e.g., packetized voice or data to or from the user device).

Figure 3:
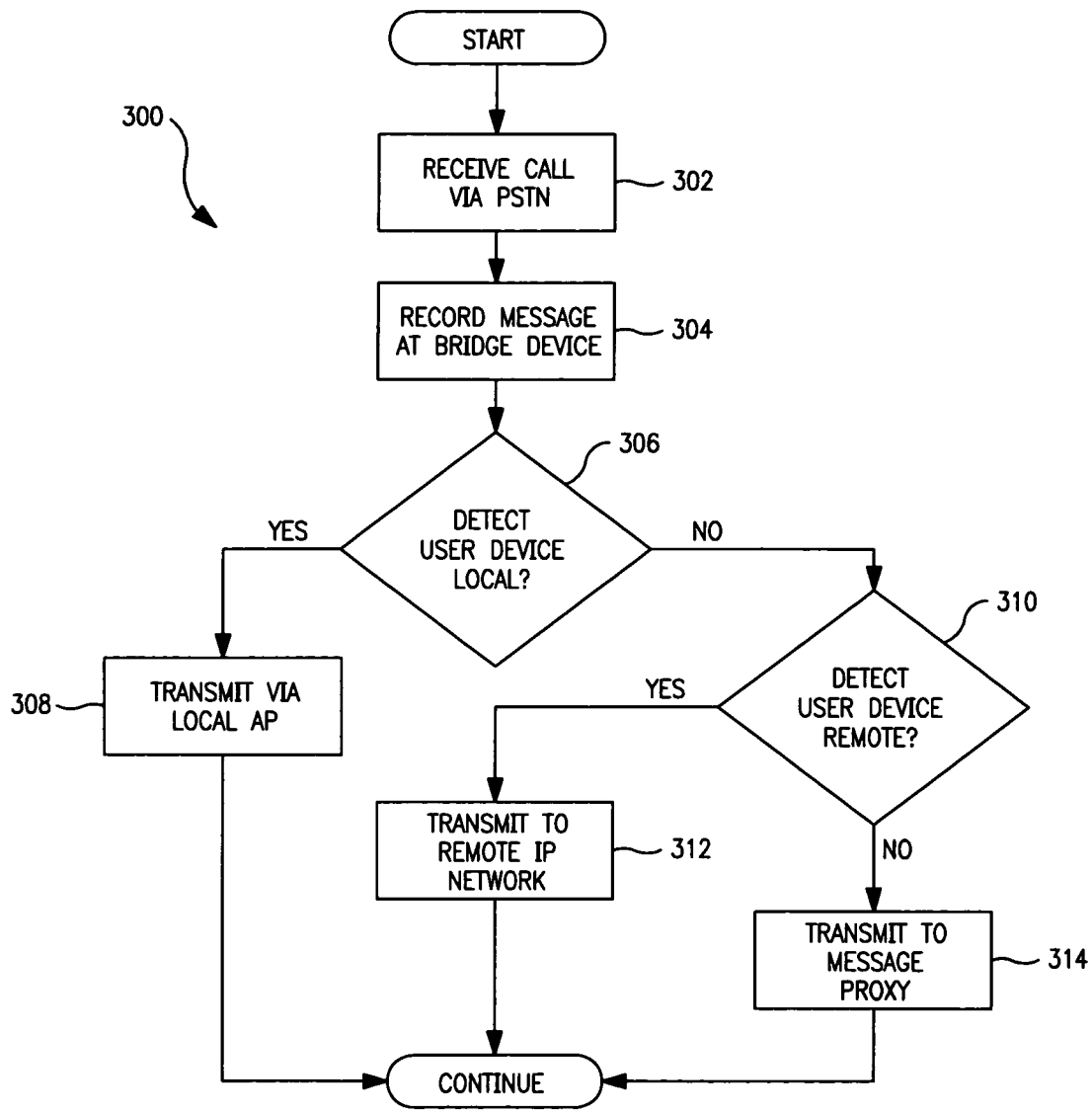
FIG. 3 is a logical flow diagram illustrating one embodiment of a method for forwarding of voice messages onto a variety of network topologies in accordance with the principles of the present invention.

Referring now to FIG. 3, an exemplary generalized process 300 for forwarding recorded voice or data messages from a PSTN to a user device is shown and described in detail. Such a process is useful in embodiments in which the user does not wish to answer calls at the user device 120 that originate from the user's PSTN, but rather periodically check and receive voice and/or data received from those PSTN calls.

At step 302, the bridge device receives a telephone call via its PSTN network interface. In an exemplary embodiment, the decision on whether or not to process the incoming call is handled by a rules-based application or other logic resident within the bridge device 130. For example, one such rule might be to record a message for the incoming telephone call (akin to a voicemail message or answering machine), rather than to forward that call onto the local IP network where it may be answered in real-time by a designated user.

At step 304, the bridge device answers the received call and prompts the caller to leave a voice message (e.g., via a pre-stored digital or analog voice recording). From the perspective of the caller, the answering service will be like any other voicemail system or answering machine. The caller's message is then recorded by the bridge device so that it may be accessed at a later time by the user, whether directly via the bridge device 130 or indirectly via the user device 120.

At step 306, the bridge device will attempt to detect whether or not the user device is available locally via an IP connection (e.g. via an indigenous or local AP). This can, in an exemplary implementation, be accomplished via the transmission of a status message sent via the local IP network. For example, a connection list can be queried at the AP by the bridge device, and the bridge device can then determine whether the user device's network or hardware address has been found on the connection list.

In an alternative implementation, a message intended to elicit a response from the user device 120 (for example, a "ping" message) is transmitted to the user device from the bridge device via a local IP network. If an appropriate response is received at the bridge device 130, the recorded message is transmitted via a local network (such as a local AP) to the user device at step 308. Alternatively, application layer processes (e.g., communication between the two voicemail applications on the respective platforms) can be utilized to inform each device regarding the other's presence or status.

However, if it is determined at step 306 that a user device on the authorized list of devices is not connected to the local network, it is next optionally determined whether user device 120 is located on any remote networks at step 310. While envisioned in the exemplary embodiment as detecting the presence of the user device on a local IP network or remote IP network in two distinct processing steps, it is understood that the bridge device may be configured to merely seek to determine whether the user IP device is located on any IP network (such as via the exemplary ping or other message described previously). At step 312, if it is determined that the user IP device is connected to a remote IP network, the recorded message is transmitted to the user device 120 via the remote IP network via the broadband or other network interface of the bridge device (which may also include the data band of an ADSL or similar modem on the PSTN connection over which the call was received).

At step 314, if the user IP device is not detected on either a local IP network or a remote IP network, then the recorded message data is optionally transmitted via the bridge device's broadband or other connection to an external message proxy (e.g., central repository that is provided by a telecommunications service provider such as a cellular network) which can then prompt the user that a message is available. In one variant, the central repository is the user's cellular voicemail account. In another variant, the repository is a webmail or unified messaging server. Other variants will be readily appreciated by those of ordinary skill given the present disclosure.

Figure 3A:
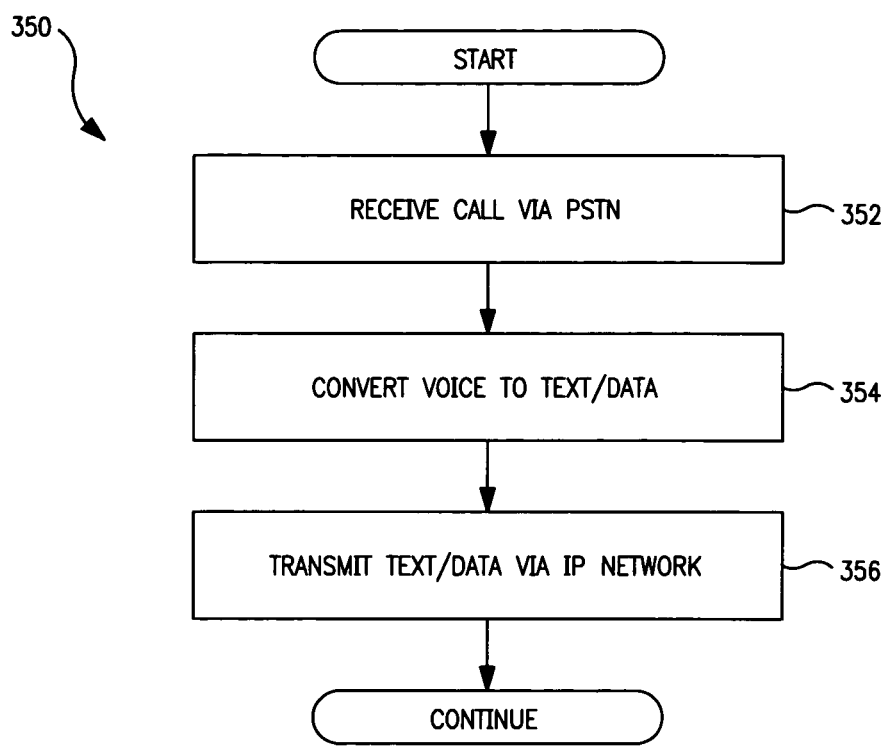
FIG. 3A is a logical flow diagram illustrating one embodiment of a method for transmitting converted voice messages across differing network topologies in accordance with the principles of the present invention.

Referring now to FIG. 3A, a generalized process 350 for converting received voice messages to text and/or data is illustrated. The process starts at step 352, where the bridge device receives a call via the PSTN network interface. The bridge device will, in an exemplary embodiment, detect the incoming PSTN call and decode the caller identification (CID) information associated with the call so that this information may be utilized in subsequent processing steps.

At step 354, information received at step 352 is converted into text and/or data. This conversion is accomplished in one variant using any number of well known speech recognition algorithms that sample the analog voice and convert it to a textual or data character representation. For example, MFCC (Mel Frequency Cepstral Coefficients) or cochlea modeling, may be used. Phoneme/word recognition, if used, may be based on HMM (hidden Markov modeling), although other processes such as, without limitation, DTW (Dynamic Time Warping) or NNs (Neural Networks) may be used. Myriad speech recognition systems and algorithms are available, all considered within the scope of the invention disclosed herein.

As will be appreciated by those of ordinary skill, such conversion may be accomplished in place or in parallel with digital voice coding (e.g., vocoding to a CELP or other representation) if desired.

Similar to the discussion above with regards to FIG. 3, in one embodiment, the decision on whether or not to process the incoming call is handled by an application or other logic resident within the bridge device 130 itself. For example, one such rule might be to forward text-based messages only from certain callers, while forwarding only missed call data (comprising the decoded CID data) for a different subset of callers.

At step 356, the text and/or data collected and converted from the received PSTN call is forwarded onto the packet network (e.g., WLAN) towards the user device 120. In an exemplary embodiment, this forwarded message is sent as a text message (e.g. a SMS message) such as via an IP-based back-end which allows IP initiated SMS messages to be sent to a handset. The content of this message, as indicated previously, could be a translated text-based version of the voice message left by the caller, and/or may comprise information about the call, such as time of the call and the telephone number of the caller so that the user of the user device 120 can independently make use of the information received.

Figure 4:
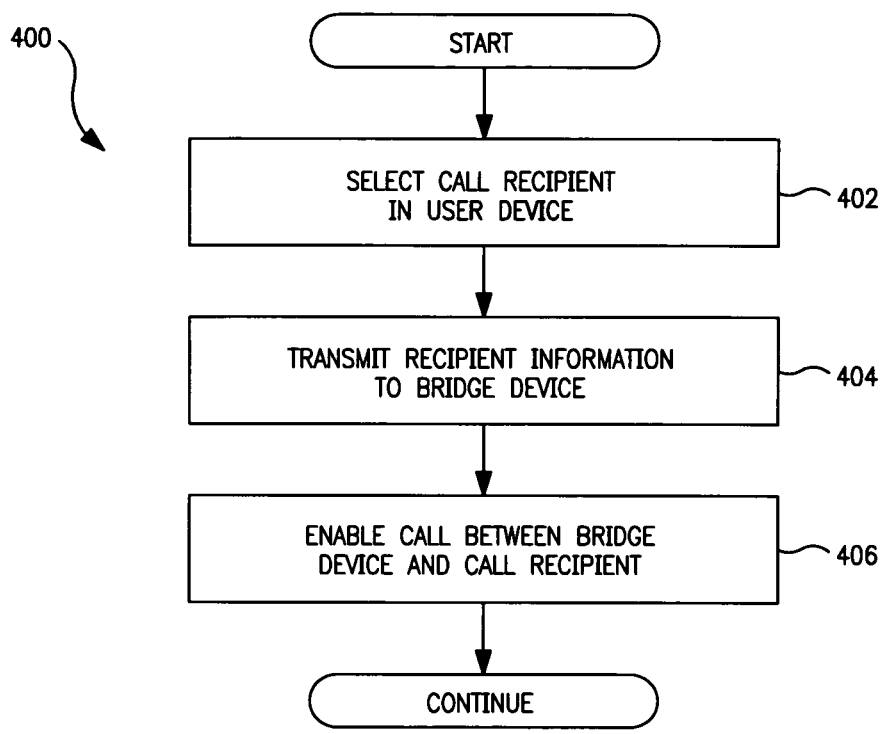
FIG. 4 is a logical flow diagram illustrating one embodiment of a method for placing remote calls via the bridge device of FIG. 1C in accordance with the principles of the present invention.

Referring now to FIG. 4, yet another process 400 for utilizing the bridge device of FIG. 1C is shown and described in detail. Specifically, the generalized process shown in FIG. 4 enables the user of the user device 120 to make remote calls via the bridge device 130. At step 402, the user selects a call recipient in the user device (e.g., via a phonebook or similar application resident on the user device 120), or by simply dialing in a telephone number, selecting "redial", etc. In one exemplary embodiment, this call is initiated through a VoIP or similar application resident on a user device via the WLAN, as described in greater detail below.

At step 404, the call recipient's information is transmitted to the bridge device in a packetized format. For example, in one exemplary embodiment, an IP connection is established between the user device and the bridge device via the WLAN bearer. Information (such as telephone number) about the call recipient is then forwarded to the bridge device 130 based on the transmitted packets, and a connection attempted via the PSTN or broadband IP connection (e.g., using a session initiation protocol such as the well known SIP protocol, or another mechanism).

At step 406, a packet call (e.g., VoIP call) is enabled between the user device 120 and the call recipient over the PSTN/broadband connection, via the bridge device 130. Specifically, the VoIP software stack on the user device 120 will receive the user's analog voice via a microphone; digitize it via a codec or compression algorithm, packetize it (e.g., according to an RTP/RTCP (or RTCP XR of RFC3611, which is incorporated herein by reference in its entirety) or other such suitable protocol), and transmit it over the WLAN bearer to the bridge device 130. The bridge device receives the packets and then, since it has established communication with the remote entity (which may be a remote user's VoIP application on a PC, or a network gateway to a PSTN or cellular network for example), forwards the voice packets to the destination network address for decoding and playout.

It will also be recognized that the bridge device can be configured to enable the user device 120 to place telephone calls through the bridge device 130 from anywhere the user has access to an IP network (including both local and remote IP networks) via a VoIP service. For instance, the user may not have VoIP service or a subscription at a temporary remote point where they are presently located. However, if they have access to an IP (e.g., broadband Internet) connection such as a remote Wi-Fi or WiMAX AP, they can utilize this AP (via the WLAN or WiMAX interface on the user device 120) to establish a session with the bridge device 130. Since the user's bridge device is established and ostensibly "registered" with their home VoIP service provider, the call will be recognized and processed by the network service provider, since it appears to have been originated from the user's premises (i.e., via VoIP software running on the bridge device 130) versus the remote location. Hence, under this embodiment, the user's bridge device acts as a VoIP gateway of sorts.

Business Methods—

In another aspect of the invention, methods of doing business relating to the foregoing integrated telecommunications capabilities are disclosed.

For instance, in one aspect, such methods of doing business comprise providing integrated services, such as those described above, via a subscription or other service plan. Much as service providers presently "bundle" services such as broadband Internet and VoIP (e.g., over an HFC cable system, satellite, or other bearer network), the present invention contemplates that the ability to "bridge" PSTN or VoIP calls sent to a user's PSTN or landline number to that user's smartphone or other user device could be included as part of such a bundle. Moreover, "family" or other multi-user plans are envisaged. Similarly, data services can be included in such a plan (e.g. broadband data over the PSTN via DSL, passed via the bridge to the user device 120) if desired.

In one embodiment, the bridge device is a separate apparatus provided by a user's telephone and/or Internet service provider (or which may be integrated with other service provider equipment such as the DSTB, etc.). The user can also lease a bridge device apparatus on a monthly basis under another business model, or alternatively purchase a bridge device apparatus which might be subsidized by the service provider in exchange for a long term contract.

Moreover, by "pushing" voicemail capability to the user device, some traditional services/capabilities may be obviated. For example, in a business environment, the ability to unify voicemail environments on the user's cellular phone would in some cases allow that user to drop their "Centrex" or similar PSTN-based voicemail, since voicemail calls will either be fielded by the bridge device 130 (acting as a proxy for the user device 120) when the latter is not in communication with the bridge, or the user device itself.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of forwarding circuit-switched information to a mobile device that is configured for packetized communications within a wireless local area network, the method comprising:
   receiving a voice call comprising the circuit-switched information via a circuit-switched network;
   converting the circuit-switched information of the voice call into a packetized format that is suitable for transmission via the wireless local area network;
   receiving a poll from the mobile device;
   sending a response to the received poll to the mobile device, the response causing the mobile device to wake from a power conserving state that is associated with a substantially dormant state of the mobile device, wherein the waking from the power conserving state activates at least a portion of the mobile device from the substantially dormant state; and transmitting the packetized format of the circuit-switched information to the mobile device via the wireless local area network.

2. The method of claim 1, further comprising:
receiving at least one of packetized voice or data from the mobile device;
converting the received at least one of packetized voice or data to a circuit-switched format that is suitable for transmission over the circuit-switched network; and
transmitting the converted circuit-switched format of the at least one packetized voice or data over the circuit-switched network to a recipient.

3. The method of claim 1, wherein:
the receiving the circuit-switched information of the voice call comprises receiving voice information rendered in an analog form; and
the converting the circuit-switched information into a packetized format comprises encoding the voice information rendered in the analog form to a digital form using a coder/decoder (codec).

4. The method of claim 3, wherein the codec comprises a code-excited linear prediction (CELP) based codec.

5. The method of claim 1, wherein:
the wireless local area network is Wi-Fi compliant; and
the transmitting the packetized format of the circuit-switched information to the mobile device via the wireless local area network comprises transmitting the packetized format of the circuit-switched information from a Wi-Fi access point to the mobile device.

6. The method of claim 1, wherein the method further comprises:
receiving the transmitted packetized format of the circuit-switched information at the mobile device;
converting the received packetized format of the circuit-switched information to an analog form; and
playing the converted analog form of the packetized format of the circuit-switched information over a speaker of the mobile device.

7. The method of claim 1, wherein:
the mobile device has an associated mobile communication address; and
the packetized format of the circuit-switched information is transmitted to the mobile communications address.

8. The method of claim 7, wherein the mobile communication address is an internet protocol address.

9. The method of claim 1, wherein the packetized format of the circuit-switched information is associated with a digitally rendered voicemail message.

10. The method of claim 1, further comprising causing a cellular interface of the mobile device to indicate a busy state or a call waiting state when receiving the transmission of the packetized format of the circuit-switched information.

11. A method of forwarding circuit-switched information to a mobile device via a packet-switched network, the method comprising:
receiving a voice call comprising the circuit-switched information via a circuit-switched network;
storing the circuit-switched information associated with the voice call for a limited period of time;
converting the stored circuit-switched information into a packetized text format that is suitable for transmission via a packet-switched network; and
transmitting the packetized text format of the stored circuit-switched information to the mobile device via the packet-switched network,
wherein the packet-switched network is not a cellular telecommunication network.

12. The method of claim 11, wherein:
the mobile device is a cellular phone that is configured to communicate over a cellular network; and
the packet-switched network is a wireless local area network (WLAN).

13. The method of claim 11, wherein the acts of receiving, storing, converting and transmitting are performed within a premises apparatus located within a home of a user associated with the mobile device.

14. The method of claim 11, wherein the converting comprises utilizing a speech recognition algorithm to recognize the circuit-switched information associated with the voice call to convert the circuit-switched information to the text format.

15. A method for processing a voice call, the method comprising:
receiving the voice call from a remote device via the circuit-switched network;
attempting to establish communications with an intended recipient of the voice call via a wireless local area network (WLAN), wherein the intended recipient of the voice call is associated with a mobile device having cellular communications capability;
transmitting a ping message to the mobile device associated with the intended recipient;
listening for a response to the ping message from the mobile device to determine whether the mobile device is within a wireless communications range of the WLAN; and
responsive to a determination that the mobile device is not within the wireless communications range of the WLAN, attempting to establish communications with the intended recipient of the voice call via a cellular telecommunication network that is compliant with the cellular communications capability of the mobile device.

16. The method of claim 15, wherein:
the WLAN is a Wi-Fi compliant network; and
the mobile device further has Wi-Fi communications capability.

17. The method of claim 15, wherein the circuit-switched network is a plain old telephone system (POTS) network or a public switched telephone network (PSTN).

18. An apparatus configured to enable communications via two or more different communication networks, the apparatus comprising:
a first network interface in operative communication with a first network that is associated with a plain old telephone system (POTS) network or a public switched telephone network (PSTN) supporting circuit-switched communications;
a second network interface in operative communication with a second network that is associated with a wireless local area network (WLAN) supporting packet-switched communications;
one or more processors coupled to the first network interface and second network interface; and
a storage device coupled to the one or more processors, the storage device comprising computer executable instructions, which when executed by the one or more processors, cause the apparatus to:

receive a voice call comprising circuit-switched information via the first network;

receive a poll from a mobile device via the second network interface;

send a response to the received poll to the mobile device, the response causing the mobile device to exit from a power conservation mode that is associated with a substantially dormant state of the mobile device; and transmit the received circuit-switched information of the voice call to the mobile device in a packetized format via the second network.

19. The apparatus of claim 18, wherein the apparatus comprises a personal computer (PC).

20. The apparatus of claim 18, wherein the apparatus comprises a stand-alone computing device.

21. The apparatus of claim 18, wherein the apparatus comprises a wireless dongle adapted to mechanically and electrically interface with another device.

22. The apparatus of claim 21, wherein the wireless dongle comprises a high speed serial bus protocol interface.

23. The apparatus of claim 21, wherein the wireless dongle comprises a Universal Serial Bus (USB)-compliant interface.

24. The apparatus of claim 21, wherein the wireless dongle comprises a Wi-Fi compliant wireless interface.

25. The method of claim 15, wherein when a response to the ping message is received from the mobile device, the mobile device is determined to be within the wireless communications range of the WLAN.

26. The method of claim 15, wherein when a response to the ping message is not received from the mobile device, the mobile device is determined not to be within the wireless communications range of the WLAN.

* * * * *